United States Patent [19]

Asakawa et al.

[11] Patent Number: 4,463,290

[45] Date of Patent: Jul. 31, 1984

[54] INDUCTION TYPE POSITIONING SYSTEM

[75] Inventors: Kazuo Asakawa, Kawasaki; Toshimasa Miyazaki, Yokohama, both of Japan

[73] Assignee: Fujitsu Limited, Kawasaki, Japan

[21] Appl. No.: 271,044

[22] Filed: Jun. 5, 1981

[30] Foreign Application Priority Data

Jun. 6, 1980 [JP] Japan ................. 55-76164

[51] Int. Cl.³ ............................... G05B 11/00
[52] U.S. Cl. ................................ 318/135; 318/467; 318/687; 318/757
[58] Field of Search ............... 318/687, 135, 626, 466, 318/467, 468, 757, 768

[56] References Cited

U.S. PATENT DOCUMENTS

| | | | |
|---|---|---|---|
| 3,406,320 | 10/1968 | Hemker | 318/626 |
| 3,638,093 | 1/1972 | Ross | 318/687 |
| 3,735,162 | 5/1973 | Alth | 310/13 |
| 4,012,676 | 3/1977 | Giebler | 318/687 X |
| 4,031,443 | 6/1977 | Droux et al. | 318/687 X |
| 4,357,568 | 11/1982 | Hore | 318/695 |
| 4,359,677 | 11/1982 | Dennon | 318/687 |

FOREIGN PATENT DOCUMENTS 56-72707 6/1981 Japan ................. 318/626

*Primary Examiner*—B. Dobeck
*Attorney, Agent, or Firm*—Staas & Halsey

[57] ABSTRACT

An induction type positioning system which accurately stops a movable part without a contact and holds it in the stopped position without depending on the friction force of mechanical contact is disclosed. A primary core consisting of a main pole, an auxiliary pole, and a single phase AC magnetic field generation coil, and a conductive plate which moves relative to this primary core, generate a holding force for suppressing the relative movement between the primary core and the conductive plate by use of the eddy current which is induced on the conductive plate by the field generated by the main pole at the position where the conductive plate is place on the auxiliary pole and simultaneously the edge of the conductive plate is placed on the main pole, and by use of the eddy current which is induced on the conductive plate by the field generated from the auxiliary pole. This structure provides a positioning system and simple braking mechanism such that positioning is not dependent on mechanical friction, thus, avoiding the heat, smell, smoke and noise associated with the conventional mechanical system.

For this reason, the system is particularly suited for installation within an office system.

23 Claims, 30 Drawing Figures

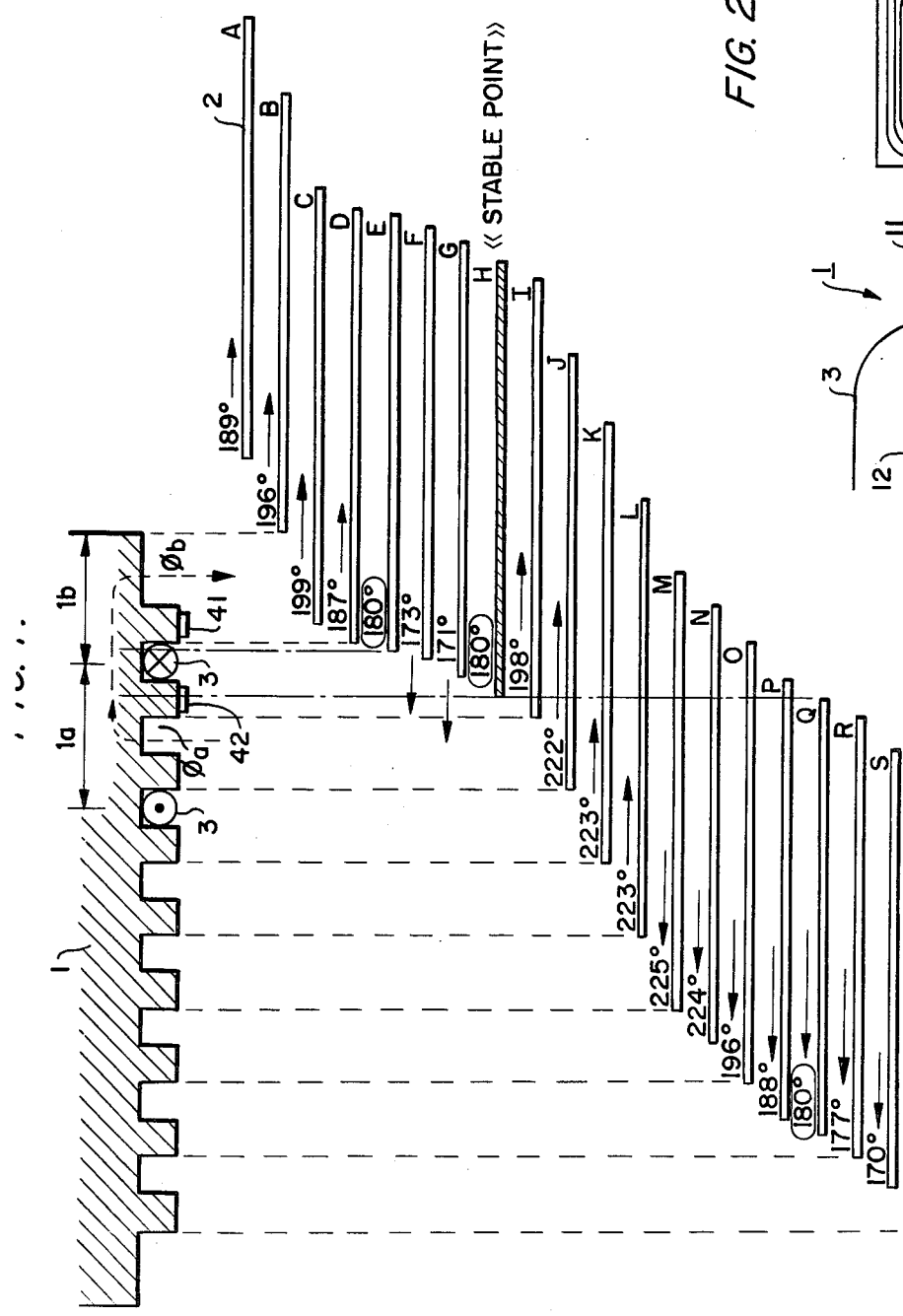
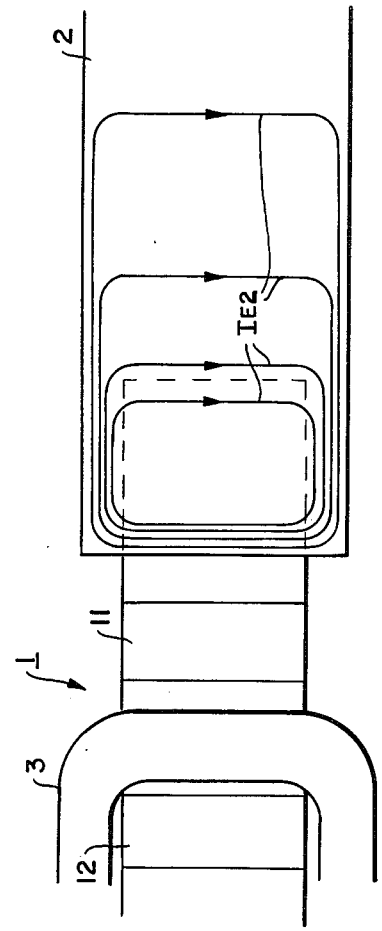
FIG. 2.

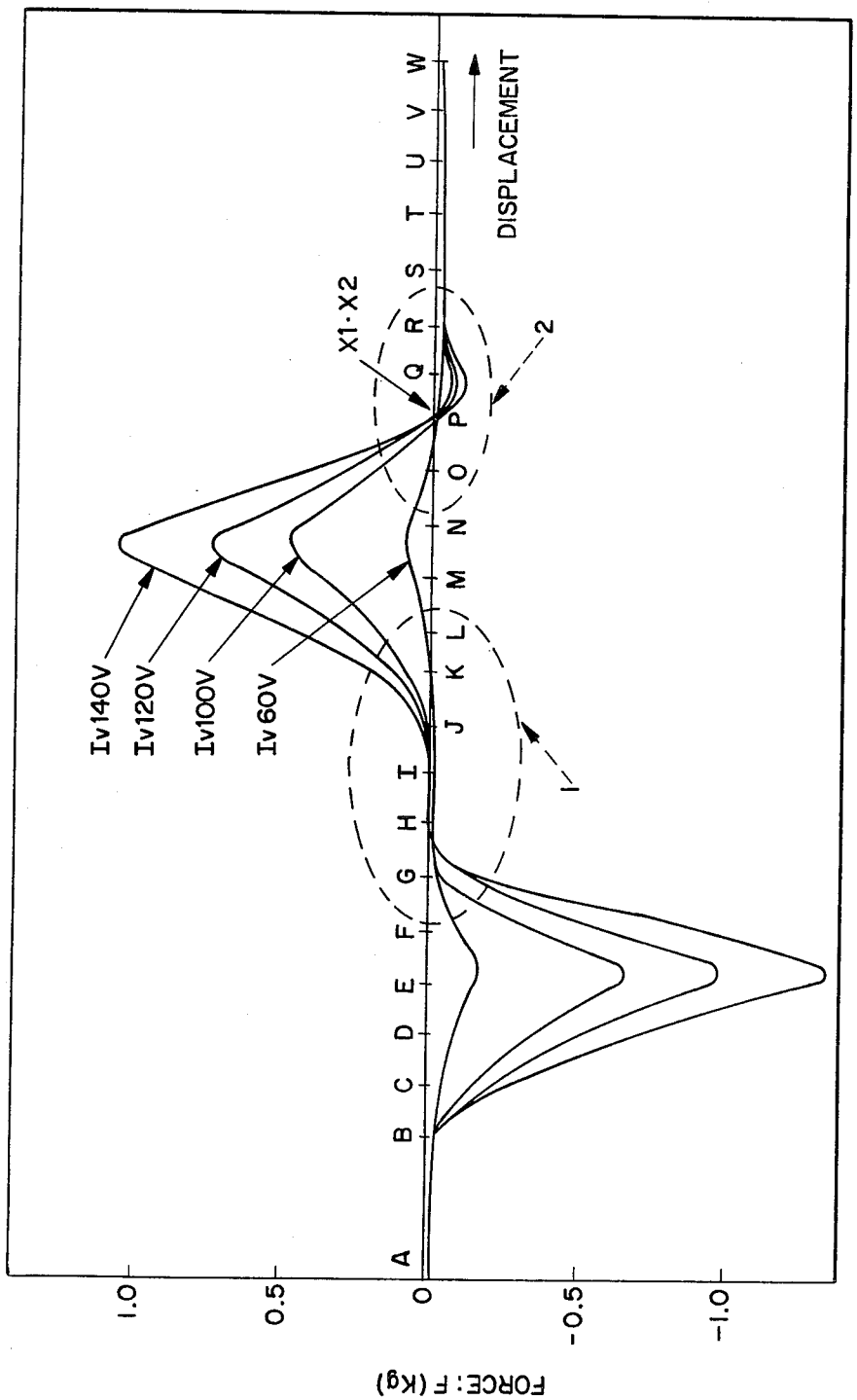

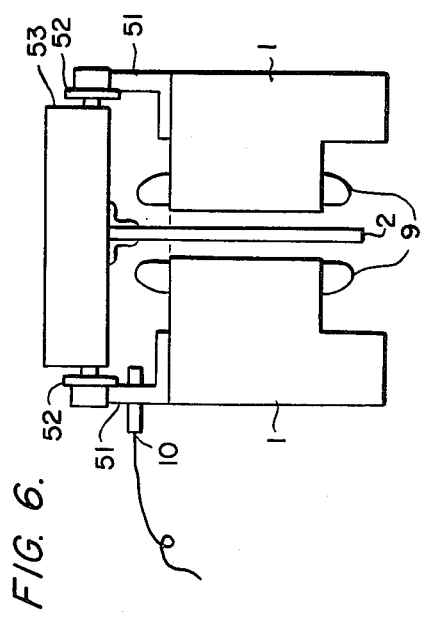

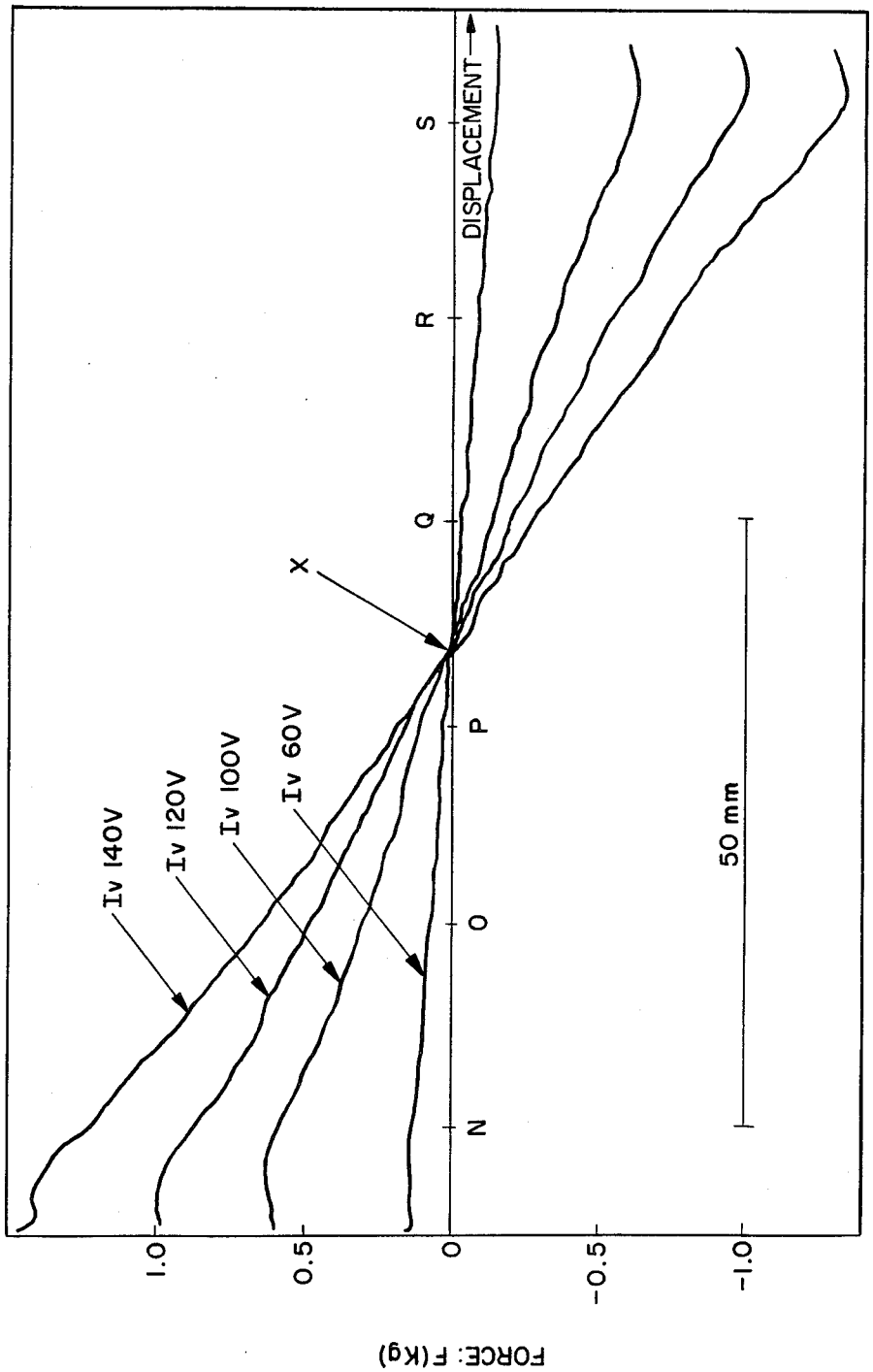

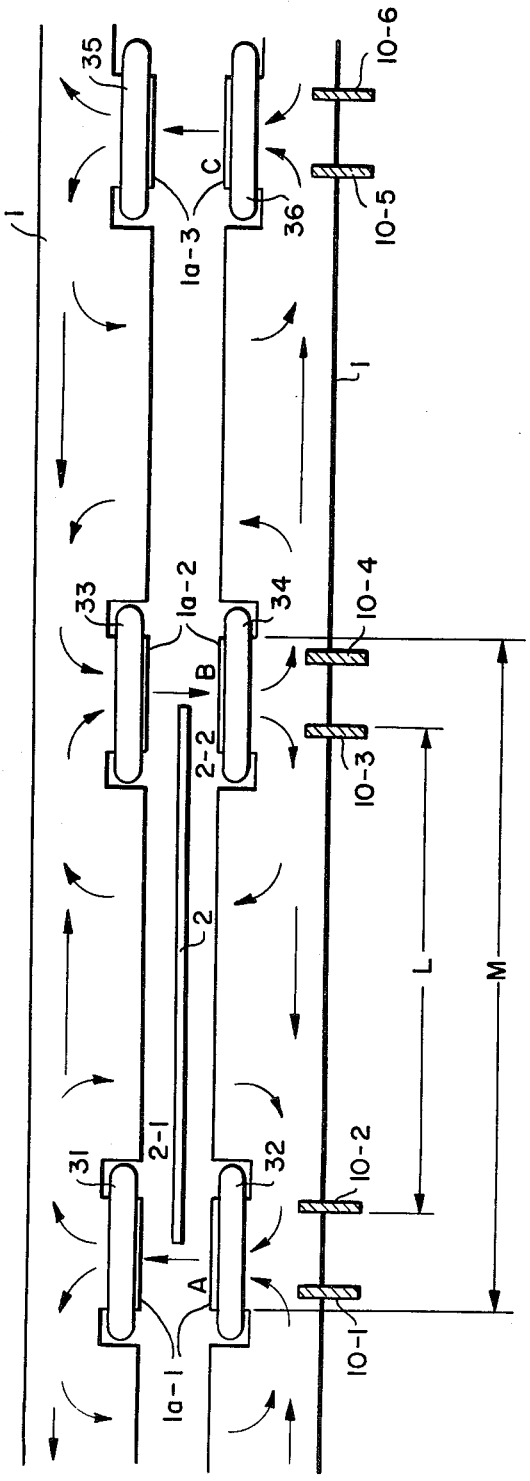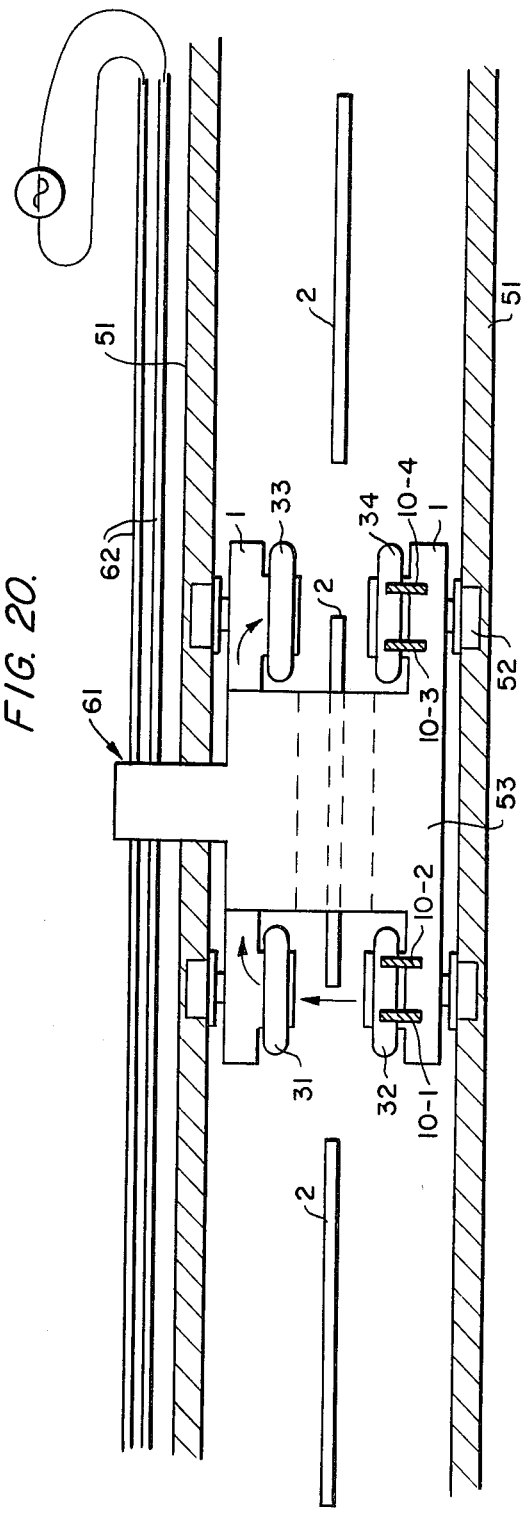

INDUCTION TYPE POSITIONING SYSTEM

BACKGROUND OF THE INVENTION

1. Field of the Invention

The present invention relates to an enduction type stop and holding system and offers an induction type positioning system which is suitable for employment in various kind of automatic control systems, physical distribution systems and material carrying systems.

2. Description of the Prior Art

Within the application field of this invention, a positioning system is provided to stop and hold such condition of a movable part at a specified position.

For example, the stop position in a movable body positioning system for a linear motor car has been determined by a friction brake utilizing mechanical friction generated between the movable part, namely the movable body, and the guide rail which guides the movable body.

However, the system of this type results in the following problems:

1. a complicated braking mechanism including a friction plate is necessary,
2. the stop position of the movable part changes due to the changes in the friction of the friction plate,
3. the friction heat adversly effects the mechnical part and
4. friction results in smell, smoke and noise, because the stop position is determined by the friction force through the mechanical contact between the movable part and guide rail. Particularly, such problems result in notable inconvenience for employment of such a system into office equipment.

Thus, in order to solve such disadvantages, it has been proposed to determine the stop position of the movable part while keeping the non-contact condition and without utilizing the friction force of mechanical contact.

In one method, when the movable part reaches the specified stop position, a first travelling magnetic field generation coil provided in a side of the guide rail generates a travelling magnetic field in the opposite direction to the travelling direction of the movable part, and meanwhile a second travelling magnetic field generation coil provided in the side of the guide rail generates a travelling magnetic field in the opposite direction to the direction of the travelling magnetic field generated by the first travelling magnetic field generation coil. Namely, the stop position is determined by applying the equal travelling magnetic fields on the travelling movable part in mutually opposite directions. (This method is disclosed, for example, in the material entitled "The Engineer in Wonderland", E. R. LAITHWAITE, 1967.)

However, this method also has the following disadvantages. First, it is very delicate and difficult to select the timing of applying the two travelling magnetic fields to the movable material. Second, the forces generated by the two travelling magnetic fields must strictly be equal. Third, it is not the only necessary to design the magnetic circuit in order to obtain the equal forces of the travelling magnetic fields but also the forces may easily be unbalanced due to an external factor. Fourth, the current must always be supplied to the two coils while the movable part is being held at the stop position and therefore a large amount of power is consumed making uneconomical the operation. Fifth, the movable part is likely to vibrate between the two coils and in such a case the movable part is not in a stationary condition. Sixth, the structure is inevitably complicated.

SUMMARY OF THE INVENTION

It is an object of the present invention to realize an induction type stop and holding system which is capable of accurately stopping and holding the movable part without any contact part and also to hold it at the predetermined stop position using a simple structure.

Such objects of the present invention can be attained by an induction type positioning system comprising a primary core comprising a main pole, an auxiliary pole and a single phase AC magnetic field generation coil (hereinafter referred to as the single phase coil), and a conductive plate which moves relative to this primary core, thereby a holding force is generated for suppressing the relative movement between the primary core and the conductive plate by means of eddy currents which are induced on the conductive plate by the field generated by the main pole at the position where the conductive plate is placed on the auxiliary pole and simultaneously the edge of the conductive plate is placed on the main pole, and the eddy current induced on the conductive plate by the field generated from the auxiliary pole.

Namely, according to the present invention, a conductive plate can be accurately stopped at a predetermined position by generating two eddy currents in the conductive plate by means of a magnetic circuit comprising the single-phase coil and a pair of poles. Thereby, the structure is very simple and assures stable stopping and holding operation.

BRIEF DESCRIPTION OF THE DRAWINGS

FIG. 1 to FIG. 5 explain the principle of the present invention;

FIG. 6 to FIG. 10 explain the 1st embodiment of an induction type stop and holding system of the present invention;

FIG. 18 and FIG. 19 show the 6th embodiment of the present invention respectively;

FIG. 20 shows the 7th embodiment of the present invention;

DETAILED DESCRIPTION OF THE EMBODIMENTS OF THE INVENTION

Figure 3:
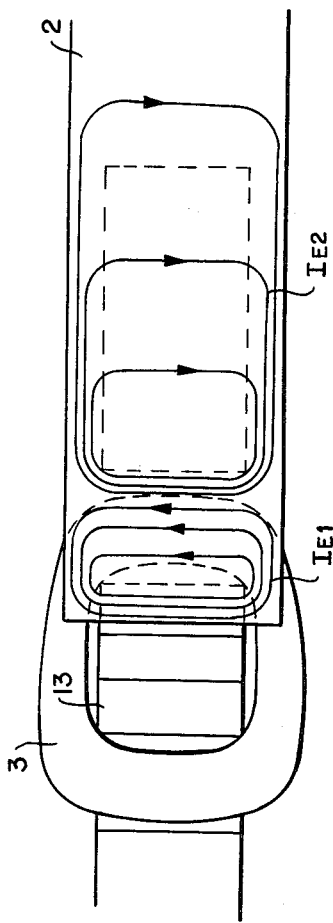

FIG. 1 shows the operation principle of an induction type positioning system of the present invention. In this figure, reference numeral 1 is a fixed primary core; 2 is a secondary conductor having a predetermined length and consisting of good conductive material such as aluminum or copper; 3 is a single-phase coil wound around a part of the primary core 1. In additon, 41 and 42 are hall effect elements; elements 41 and 42 are respectively provided at two teeth of the primary core 1 and detect a phase difference of magnetic fluxes between the area 1a forming the main pole of primary core 1 and the area 1b forming the auxiliary pole of it. The arrow marks in the figure indicate the direction and intensity of the forces applied to the entire part of the conductive plate 2 as the secondary conductor.

Next, the operation will be explained. When a current is supplied to the single phase coil 3 from the single phase AC power source (not illustrated), the magnetic flux loop indicated by the broken line in the figure is formed. Since the AC magnetic field is formed, the AC magnetic flux is also obtained. Here, the phase of magnetic flux $\Phi a$ at the main pole 1a leads, by about 180 degrees the magnetic flux $\Phi b$ at the auxiliary pole 1b.

When the secondary conductor 2 is moved from the right side of the figure toward the primary core having such magnetic circuit structure, a force directed to the right works on the secondary conductor 2 at the position indicated by A in the figure. (This force is also disclosed in the U.S. Pat. No. 3,735,162 entitled "Single Coil Linear Motor".) At this time, a phase difference between both magnetic fluxes $\Phi a$, $\Phi b$ is 180 degrees at the outputs from a pair of hall effect elements 41 and 42.

Namely, at first without the secondary conductor, the phase difference between both magnetic fluxes $\Phi a$, $\Phi b$ is almost 180 degrees. But when the secondary conductor 2 approaches the primary core 1, a phase difference between both magnetic fluxes $\Phi a$, $\Phi b$, becomes larger, and the phase of magnetic flux $\Phi b$ in the side of auxiliary pole 1b is more and more lagging compared with the phase of flux $\Phi a$. This is because an eddy current $I_{E2}$ is generated by the magnetic flux $\Phi b$ at the edge of the secondary conductor 2 as it approaches the core 1. FIG. 2 shows the condition of eddy current $I_{E2}$ flowing in the secondary conductor 2. Here, as the secondary conductor 2 approaches and reaches the position indicated by B (FIG. 1) and then the position indicated by C in FIG. 1, the eddy current $I_{E2}$ induced in the secondary conductor 2 becomes maximum due to the influence of flux $\Phi b$ caused by the auxilary pole 1b. As a result, the lagging of the flux $\Phi a$ compared with the phase of flux $\Phi b$ becomes maximum and a phase difference between them becomes 199 degrees. Therefore, the force to the right becomes maximum, and acts on the secondary conductor plate 2 as indicated by the arrow.

When the secondary conductor 2 proceeds and reaches the position indicated by D, the end point of secondary conductor 2 starts to be effected by the influence of flux $\Phi a$ caused by the main pole. Since the magnetic flux $\Phi a$ crosses the secondary conductor 2, an eddy current $I_{E1}$ is induced as shown in FIG. 3 in the secondary conductor, and flows in the opposite direction to the eddy current $I_{E2}$ which is generated by the crossing of the magnetic flux $\Phi b$ caused by the auxiliary pole 1b. As a result, a phase lag of the flux $\Phi b$ with respect to the flux $\Phi a$ gradually becomes small, and a phase difference between both magnetic fluxes becomes 187 degrees at the position D and 180 degrees at the position E. The secondary conductor 2 at the position E does not receive any force from any direction, right or left, as can be understood from the figure. However, as will be explained later, the secondary conductor 2 is unstable at the positon E, and a certain holding force cannot be obtained, which is a subject matter of the present invention.

When the secondary conductor 2 continues to proceed to the left and reaches the position F, the edge of the secondary conductor 2 is further influenced by flux $\Phi a$ caused by the main pole 1a. Therefore, an eddy current $I_{E1}$ induced in the secondary conductor due to the magnetic flux $\Phi a$ becomes large and a phase difference of flux $\Phi b$ compared with the flux $\Phi a$ becomes 173 degrees. This tendency becomes more distinctive at the positon G and in this case a phase difference becomes 171 degrees. Resultingly, a force applied to the secondary conductor 2 is directed to the left as indicated in the figure. When the secondary conductor 2 reaches the position H, a phase difference between both magnetic fluxes $\Phi a$ and $\Phi b$ becomes just 180 degrees. At this time, the secondary conductor 2 is held in the stable condition because it does not receive any force. When the secondary conductor 2 further proceeds towards the main pole 1a, a phase difference between both magnetic fluxes $\Phi a$ and $\Phi b$ exceeds 180 degrees again and it becomes 198 degrees at the position I, or 222 degrees at the positon J, . . . or 223 degrees at L. The forces applied to the secondary conductor in these positions are directed again to the right.

Then as the secondary conductor 2 is shifted to the left, the right side edge of the secondary conductor 2 is influenced by the main pole and auxiliary pole of the primary core. Namely, the secondary conductor 2 is influenced by the force directed to the left at the positions M, N, O and P. And, a phase difference between both magnetic fluxes $\Phi a$ and $\Phi b$ becomes 180 degrees again at the position Q. However, the secondary conductor 2 is not stable at this position.

The principle of the present invention will be explained in more detail by referring to FIG. 4 and FIG. 5.

Figure 4:
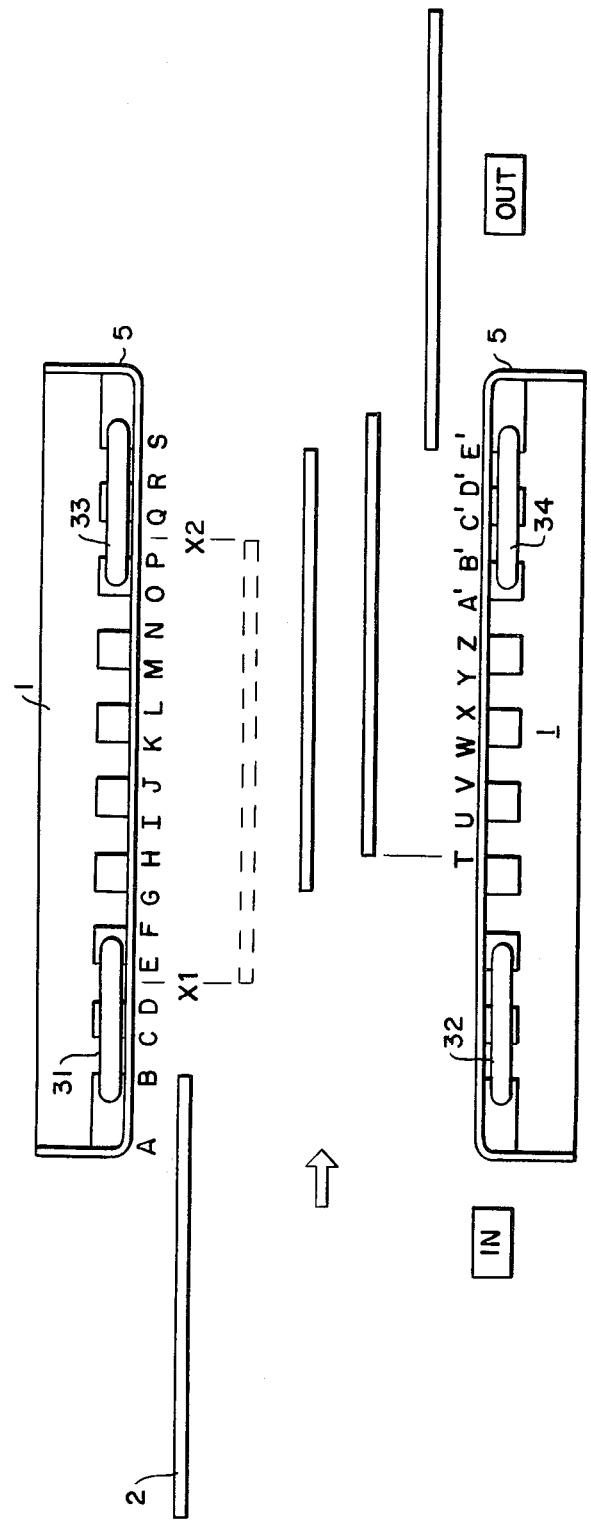

FIG. 4 corresponds to FIG. 1 and shows the relative positional relationship between the primary core and secondary conductor. FIG. 5 shows a graph obtained by sequentially plotting the force which the secondary conductor receives for each displacement between the primary core and secondary conductor when a single phase AC current is supplied to the coils 31 and 32.

In this example, the secondary conductor moves from the left to right along the fixed primary core 1. Moreover, in the same figure, a pair of primary cores arranged face to face are indicated, but in principle, only the primary core provided along a single side is enough. Moreover, in the same figure, a pair of primary cores are separated for convenience, but in practice the gap between them is very narrow. In the same figure, element 5 is a non-magnetic and insulating protection cover. In FIG. 5, a force F (kg) which is applied to the secondary conductor 2 is graduated on the vertical axis, while the physical displacement of the secondary conductor with respect to the primary core is graduated on the horizontal axis.

In addition, the letters A to W correspond to the codes A to W given to the primary core 1. The codes used in this example do not correspond to the code A to S used in FIG. 1.

In FIG. 4, the right side edge of the secondary conductor 2 proceeding from the left side is positioned at the area before the position I and is influenced by the magnetic fluxes caused by the main pole and auxiliary pole of the primary core. When the right side edge exceeds the positon I, the left side edge of the secondary conductor 2 is influenced by the magnetic fluxes caused by the main pole and auxiliary pole of the primary core.

Therefore, FIG. 5 shows the direction and intensity of force which the right side edge of the secondary conductor receives at respective postitions while the secondary conductor 2 passes the area near the primary core 1.

In other words, in FIG. 5, when the right side edge of the secondary conductor is at the position E, a force F directed to the left is maximum. Thereafter, this force F is gradually lowered and the force F becomes zero at the positons H and I.

When the secondary conductor 2 proceeds to the right, the left side edge of the secodary conductor is then influenced by both poles, and a force F directed to the right side is applied to the secondary conductor, based on the principle explained with reference to FIG. 1 to FIG. 3. The force directed to the right is maximum when the right side edge reaches the positions M and N.

When the secondary conductor 2 further moves to the right, the force F directed to the right gradually becomes weak. When the right side edge reaches the position between P and Q, the force becomes zero momentarily. In the next moment, an opposite force, namely a force F directed to the left side is applied to the secondary conductor 2.

The present invention proposes a method of stopping and holding the secondary conductor 2 which is moving by fully utilizing such a sharp zero cross point of force as the predetermined position.

The zero cross point of force corresponds to the positions indicated by the symbols $x_1$, $x_2$ in FIG. 4 and FIG. 5. Namely, when the secondary conductor 2 reaches the positon (corresponding to the position H in FIG. 1) indicated by the broken line in FIG. 4, it receives a force F which corresponds to $x_1$ in FIG. 4 at the left side edge. This force F is composed of a force which is applied to the position P (corresponding to the positons I, J, K, L, in FIG. 1) from the position N in FIG. 5 and directed to the right and a force which is applied to the position Q (corresponding to the positions F, G in FIG. 1) from the positon P and directed to the left.

The amplitude of this force F is proportional to the square value of current applied on the coils 31 and 32, and as an input voltage $I_V$ is increased the forces F corresponding to the positions $x_1$ and $x_2$ are strengthened accordingly.

The first embodiment where the principle of present invention is adapted to a linear induction motor will now be explained by referring to FIG. 6 through FIG. 10.

FIG. 6 shows the side view of the system of the present invention, while FIG. 7 the top view.

In each figure, reference numeral 9 is the travelling magnetic field generation coil wound about each pole of the primary cores 1 arranged on both sides of the secondary conductor 2; 10 and 10' are light detectors comprising a light source and a light sensor for detecting the position of secondary conductor 2; 51 is a guide rail provided continuously on the primary core as shown in FIG. 6; 52 is a wheel which can freely run on the guide rail 51; 53 is a carrier connected to the secondary conductor 2.

The positioning system of the present invention allows, as is understood from FIG. 7, that the length of secondary conductor 2 is set shorter than the length of the primary cores 1.

In addition, a pair of single-phase coils 31 and 33 (32, 34) for stopping and holding are installed into the primary cores 1 and are spaced apart by an amount almost equal to the length of secondary conductor 2. In other words, as is explained in regard to the operation principle of FIG. 1, the single phase coils 31 and 33 (32, 34) are arranged in such positions respectively so that when the secondary conductor 2 reaches the position H in the same figure, the travelling magnetic field is not formed on the secondary conductor 2, namely in the positions where the right and left forces become zero. The single phase coils 31 to 34 are so wired that the flux loop as indicated by the broken line in FIG. 7 is generated.

Moreover, light detectors 10 and 10' are provided between the positions D and E, and P and Q in FIG. 4 and with an interval between them which is equal to the length of the secondary conductor 2 or shorter than such length, and the light detectors 10 and 10' are respectively connected to a drive circuit shown in FIG. 10 which is explained later.

The operation of this embodiment will be explained sequentially. Explained first is a method of stopping and holding the secondary conductor 2 in such a case that the secondary conductor 2 makes entry from the inlet side IN (see, FIG. 7).

When the edge of secondary conductor 2 crosses the detector 10' power is supplied to the travelling magnetic field generation coil 9 in such a direction that braking is applied to the secondary conductor 2. At this time, the power is applied to the field generation coil 9 for a time determined so that the running direction of secondary conductor 2 does not change, by previously adjusting the travelling magnetic field generation coil drive circuit.

When the secondary conductor 2 further proceeds and the detector 10 detects the edge of it, a single phase voltage is simultaneously applied to both sets of single phase coils, 31 through 34 at the inlet side IN and exit side OUT, or to only the single phase coils 31 and 32 at the exit side OUT. Thereafter, such single phase AC voltage is supplied to the single phase coils 33 and 34 at the inlet side IN with a delay of a specified period (the duration of the delay time is selected, when the braking is applied to the secondary conductor 2, so that the proceeding direction does not change). Resultingly, the secondary conductor 2 is stopped at the position between the single phase coils 31 through 34 on both sides as shown in FIG. 7. Under this condition, both edges of the secondary conductor 2 stop at the repective positions between D and E, and P and Q shown in FIG. 4 and no force is applied to it. Thus, the secondary conductor 2 is held stable and in stationary condition.

FIG. 8 shows the relation between displacement and force when the single phase coils at both ends are activated. All indications in FIG. 8 correspond to those of FIG. 5. As will be understood from this figure, the waveform shown in FIG. 8 is formed in such a manner that symmetry exists about the position x. Since two pairs of single phase coils are used in this embodiment, the slope of this waveform is sharper, compared to x ($x_1$, $x_2$) in the graph shown in FIG. 5. FIG. 9 shows an enlarged view of the area near the position x in FIG. 8.

When supply of power to the single phase coil stops and it is then supplied to the travelling magnetic field generation coil 9, the secondary conductor 2 can move again in any direction selected.

Figure 10:
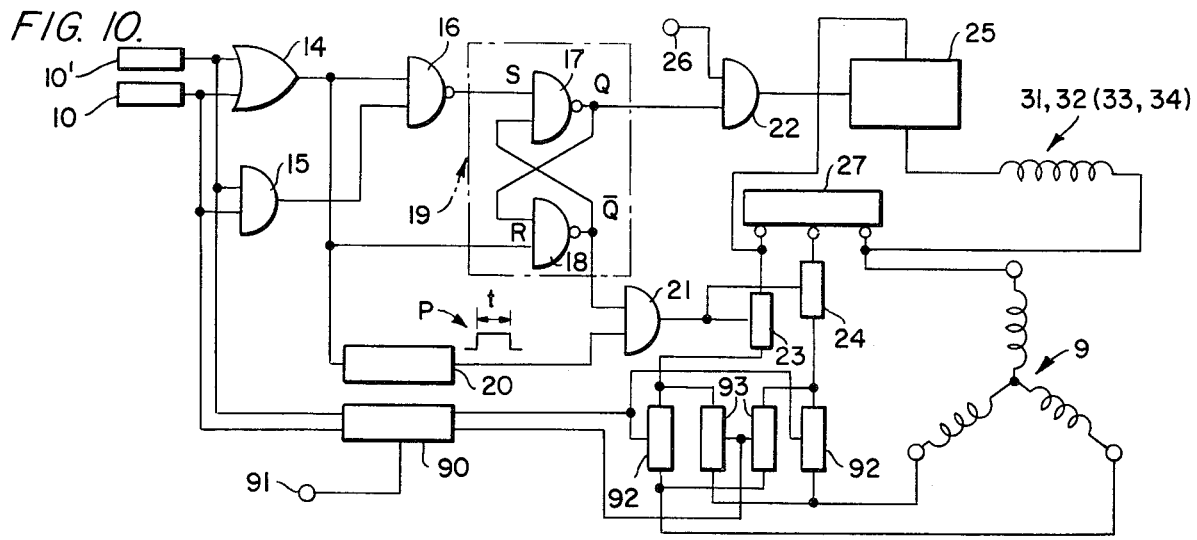

FIG. 10 shows, as an example, a drive circuit which is adapted to the abovementioned embodiment.

In the same figure, 14 is an OR circuit; 15, 21, 22 are AND circuits; 16, 17, 18 are NAND circuits, the NAND circuits 17 and 18 form a latch circuit.

Reference numeral 20 indicates a one-shot, which generates the pulse for controlling the braking period for braking the secondary conductor to the travelling magnetic field generation coil 9 for the specified period as explained above. Reference numeral 27 indicates a three-phase AC power supply. Reference numerals 23 and 24 indicate relays inserted at two output terminals of the three-phase AC power supply 27. Reference numeral 25 shows a relay inserted into the series closing circuit of the two output terminals of the three-phase AC power supply 27 and single phase coils 31, 32 (33, 34). Reference numeral 90 indicates an entry direction discrimination circuit (including the latch circuit) which determines the direction of reverse phase magnetic field for braking the secondary conductor 2. Reference numerals 92 and 93 show relays inserted into the two output terminals extended from the three-phase AC power supply 27. For the light detectors, single phase coils and travelling magnetic field generation coils the numbering of FIG. 7 is directly employed.

The embodiment shown in the FIG. 10 is a drive circuit which is adapted to the carrying system where a plurality of positioning systems of the present invention are arranged on the comparatively long carrying rail.

A reciprocal shift method is employed where the secondary conductor 2 which forms the movable part can enter the stop and holding system as shown in FIG. 7 from any direction desired along the carrying rail. This drive circuit is configured, considering the dual entrance direction of the secondary conductor into the stop and holding system.

When the entry of the secondary conductor 2 into the stop and holding system is detected by either of the light detectors 10 and 10', the detection signal is at first input to the one-shot 20. Then, the relays 23 and 24 are operated by the braking period designation pulse P, having a pulse width t which is modified via the gate 21. Simultaneously, an entry direction discrmination circuit 90 judges in which direction the reverse phase field should be applied. Thereby any of the relays 92 or 93 is operated for latching. Operations of relays 23 and 24 and relays 92 or 93 causes the reverse phase magnetic field to be applied in such a direction as to brake the secondary conductor 2 and is generated for the predetermined period on the travelling magnetic field generation coil 9 in order to brake the secondary conductor 2. When both light detectors 10 and 10' detect the entry of secondary conductor 2, the detection signal is input to a latch circuit 19 operating the relay 25, Then, power is fed to both single phase coils 31, 32 (33, 34) and the stop position is determined.

In the same figure, terminal 26 is an enable terminal, which inhibits an output of the latch circuit 19 by gate 22 and the operation of relay 25 in order to inhibit operation of the stop and holding sytem.

The terminal 91 is the terminal which enables the operation of relays 92 and 93.

This drive circuit simultaneously drives a pair of single phase coils with an output from the light detector. But it is also possible to employ the drive circuit which at first drives the single phase coil in the exit side, OUT, of the stop and holding system and then drives the single phase coil in the inlet side, IN. In this case, the drive method can be realized very easily by an addition comprising a delay circuit or sequential circuit into this drive circuit.

Figure 11:
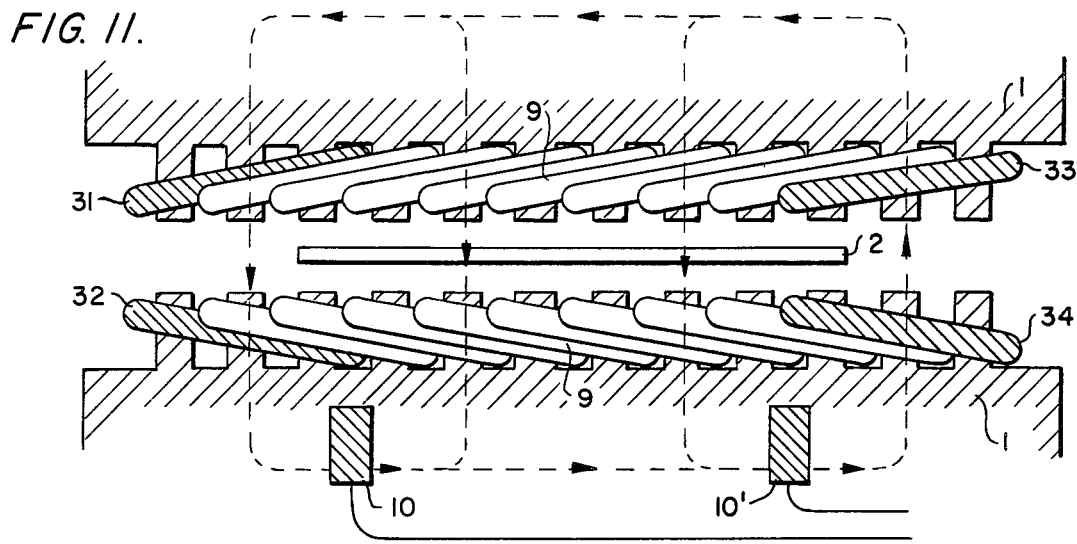
FIG. 11 to FIG. 13 explain the 2nd embodiment of an induction type stop and holding system of the present invention.
Figure 12:
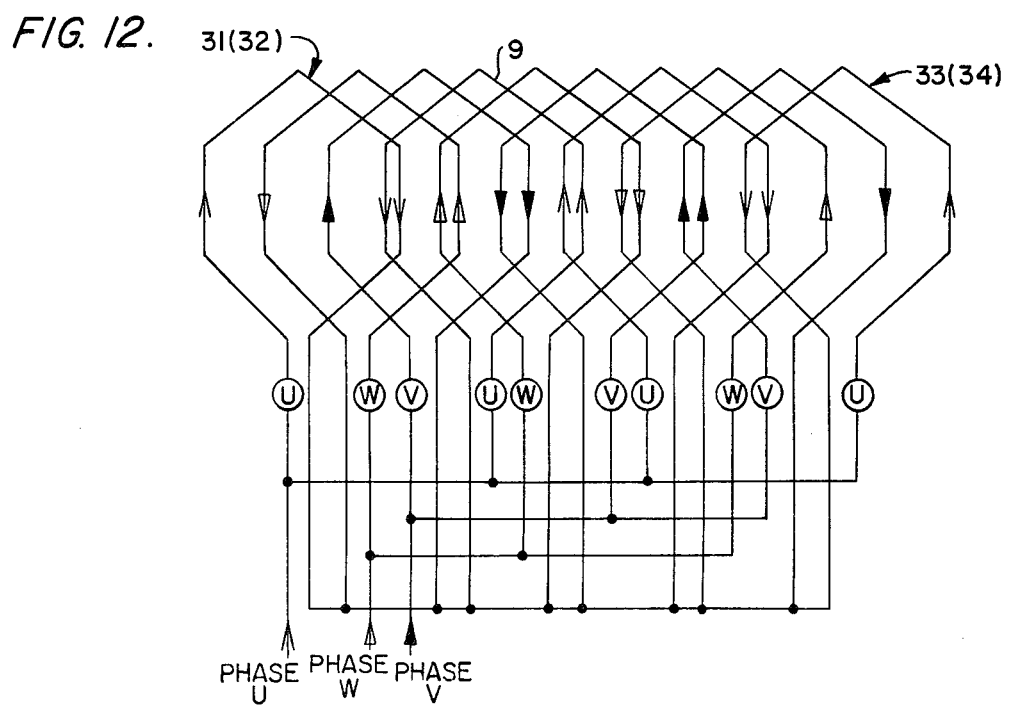
Figure 13:
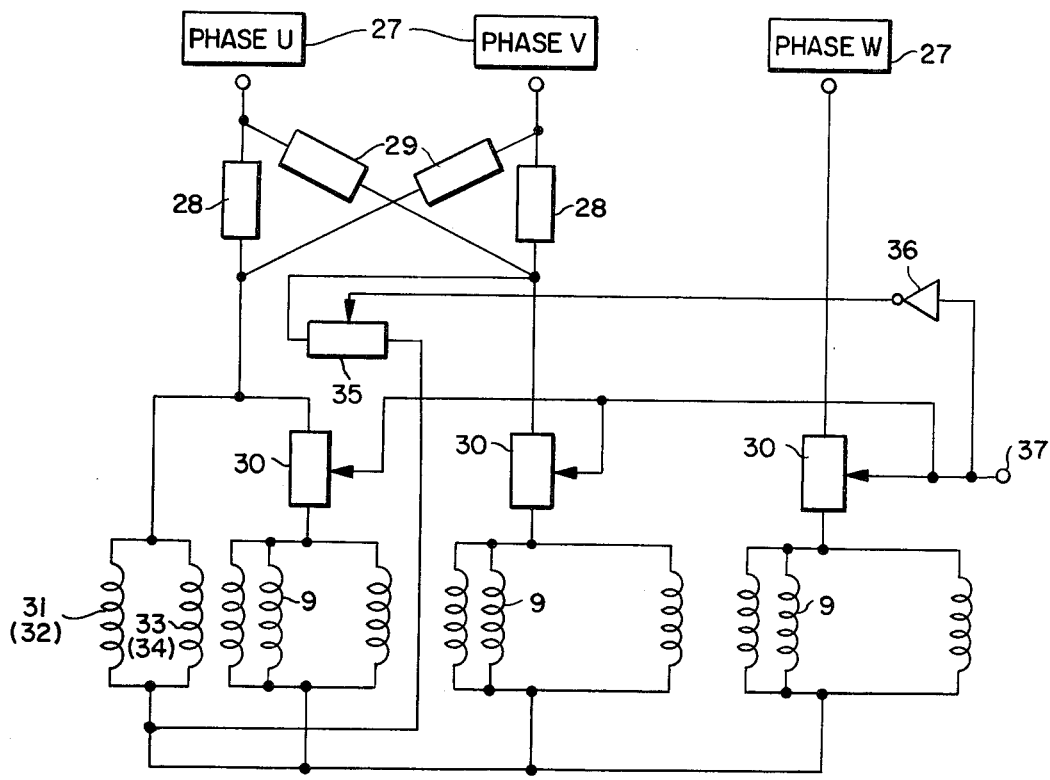

The second embodiment of an induction type stop and holding system of the present invention is shown in FIG. 11 to FIG. 13.

In this second embodiment, the single phase coil is structured by using a part of the travelling magnetic field generation coil of the first embodiment shown in FIG. 7.

This second embodiment provides the advantage that it is not required to use the single phase coil, as compared with the first embodiment. Since the basic structure of this embodiment is the same as the first embodiment shown in FIG. 7, the detailed explanation is omitted here.

The operation of this second embodiment will be sequentially explained.

FIG. 12 shows the wiring of this embodiment. The reference numerals correspond to those in FIG. 11. In addition, the three-phase AC power supply is connected in this embodiment.

Here, it should be noted that the coils wound around the primary core used in this embodiment are connected in parallel to the power supply of each phase. In other words, in the present embodiment, since the stop position of secondary conductor 2 is determined between both coils 31, 33 (32, 34) by feeding the single phase AC current at the specified time to these coils which form a part of the travelling magnetic field generation coil as mentioned above and arranged with the specified spacing, the travelling magnetic field generation coils are necessarily connected in parallel to the power supply of each phase.

FIG. 13 shows the drive circuit for the stop and holding system of the second embodiment. In this figure, reference numerals 28 and 29 are reverse phase supply change-over relays; reference numeral 30 is the travelling magnetic field generation relay; reference numeral 35 is the stop position determination relay; reference numeral 36 is the inverter; and reference numeral 37 is the start/stop signal input terminal. The other reference numerals correspond to those of FIG. 11. The start/stop signal input terminal 37 is connected to the output terminal of a 2-input NAND circuit (not illustrated). To each input of the NAND circuit, both outputs from the light detectors 10 and 10' indicated in FIG. 11 are applied. Therefore, when the data "1" is output from both light detectors 10 and 10', namely when the secondary conductor 2 reaches the position indicated in FIG. 11, an output of the NAND circuit becomes logic "0". Thereby the relay 30 for generating the travelling magnetic field is released and meanwhile the logic "0" closes the stop position determination relay 35 via the inverter 36.

As a result, the supply of the current to the travelling magnetic field generation coil 9 stops and on the other hand, the single phase AC current is supplied to the stop and holding coils 31 to 34 arranged with a certain spacing.

Namely, the relay 30 closes only when the travelling magnetic field is generated and the relay 35 closes only when the stop position is determined, by means of the control.

Although not illustrated, when one light detector outputs the data "1", namely when the secondary conductor 2 reaches the stop position, the open/close condition change-over for the relays 28 and 29 is carried out in accordance with an output from the light detector in order to supply a current in such a direction as to accelerate the braking force on the secondary conductor 2 to the travelling magnetic field generation coil 9. Of course, the reverse phase current application period is previously set to such a period that the running direction of the secondary conductor 2 does not change.

When the supply of single phase AC to the coils 31 to 34 stops and the AC current of each phase is fed to the travelling magnetic field generation coil 9, the secondary conductor 2 which has been stopped between the coils 31 to 34 can be started again and moved in the desired direction. In the drive circuit shown in FIG. 13, as shown in FIG. 11, the pitch interval of the travelling magnetic field generation and stop position determination coils 31 and 33 (32, 34) is equal to the length of odd poles and both coils are in the same phase when used as the travelling magnetic field generation coil (in this case, the length of the secondary conductor is shorter than the pitch interval of coils by the length of ½ pole). Therefore, when the pitch interval is equal to even poles, the drive circuit shown in FIG. 13 can be used. But better results can be obtained by employing such a circuit structure where the single phase AC current is supplied to any desired coil in order to form the magnetic flux loop as indicated by the dotted line of FIG. 11.

However, it is recommended, (in view of realizing the circuit shown in FIG. 13 which is simple, economical and uses fewer circuit elements), to employ the structure where the pitch interval of the travelling magnetic field generation and positioning coils as shown in FIG. 11 is equal to the length of odd poles and moreover both coils are in the same phase when used for generating the travelling magnetic field.

According to this embodiment, such structure can be realized economically by using a part of the conventional travelling magnetic field generation coil without arranging particular coils for holding the stop position.

FIG. 14 to FIG. 17 show a third embodiment of the present invention. This embodiment indicates the stop position holding system where the conductive plate which is also the secondary conductor is fixed and the primary core is used as the movable part.

Figure 14:
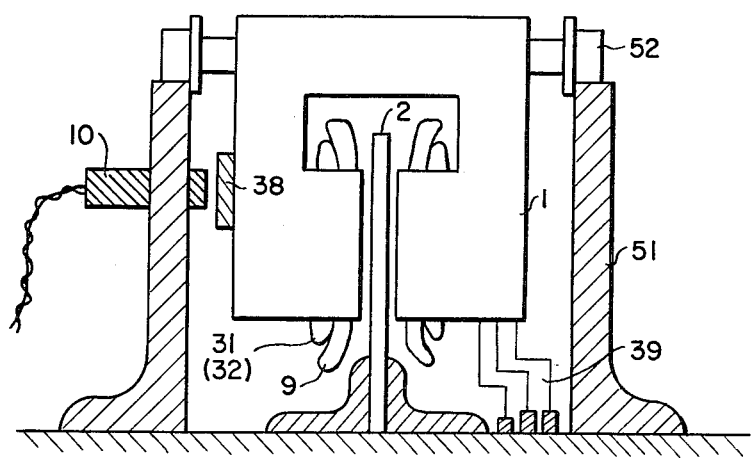
FIG. 14 and FIG. 15 explain the 3rd embodiment of an induction type stop and holding system of the present invention.
Figure 15:
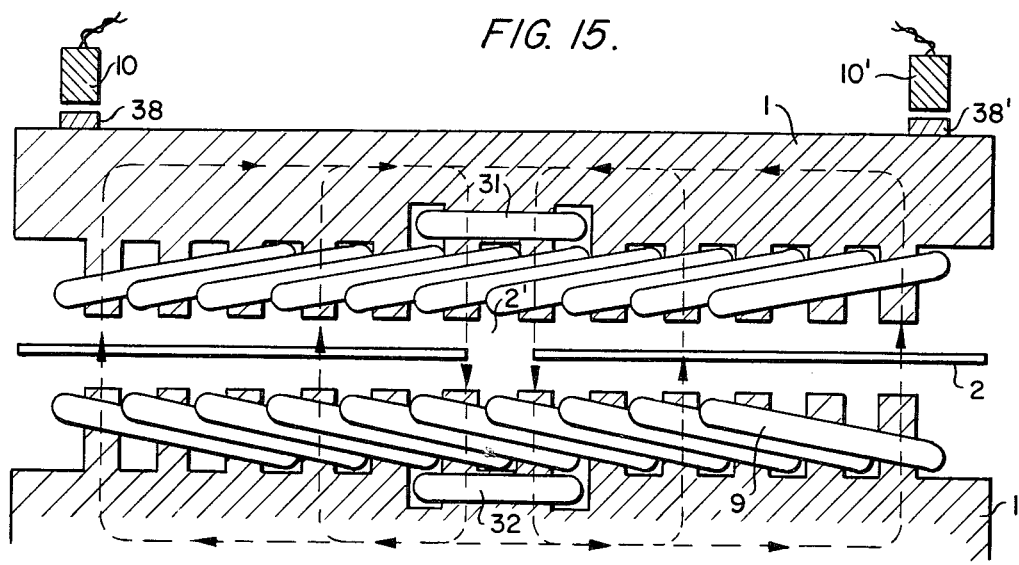

FIG. 14 is a side sectional view of the positioning system of this third embodiment. FIG. 15 is the upper sectional view of the same.

In both figures, reference numeral 1 is the primary core working as the movable part; reference numeral 9 is the travelling magnetic field generation coil wound around the primary core 1; reference numeral 31 (32) is the single phase coil for positioning; reference numeral 39 is the power supply part consisting of the power feeding rail and slide brush; reference numeral 52 is the wheel which guides and supports the primary core 1; reference numeral 51 is the carrying rail provided to carry the wheel 52; reference numeral 2 is the secondary conductor consisting of a non-magnetic conductor provided between the primary core 1 and is extended along the carrying rail 51. Reference numeral 10 (10′) indicates the light detector provided at the station for holding the stop position of the primary core 1. Reference numeral 38 indicates the reflector provided at the position corresponding to the light detector 10 (10′) of the primary core 1.

As shown in FIG. 15, the travelling magnetic field generation coil 9 is wound around the primary core 1 and moreover the single phase coil 31 (32) for stop position holding is also wound around a part of it. In addition, the secondary conductor 2 as the stationary part is provided with the cut-away part 2′.

The operation of this embodiment will be explained below. In this case the primary core 1 is guided by a carrying rail 51 and enters the station from the left side. The left side light detector 10 provided at the station detects the reflector 38′ provided on the primary core 1. As a result, an output signal of the light detector 10 is input to the drive control circuit (not illustrated), and thereby a current is fed to the travelling magnetic field generation coil 9 in such a direction as to generate a braking force. At this time, the current feeding time is of course set to such a period as the moving direction of the primary core does not change. The primary core 1 gradually enters the station while receiving the braking force, and when the light detector 10 detects the right reflector 38′ of the primary core 1, the single phase AC current is supplied to the single phase positioning coils 31 and 32 wound around the primary core 1 at the center from the drive control circuit (not illustrated). The magnetic flux generated from the single phase coils 31 and 32 for stop position holding is indicated by the broken line in the figure. As a result, the primary core 1 is accurately positioned to the stop position opposite the single phase coils 31 and 32 at the cut-away part 2′ based on the principle explained in regard to FIG. 1 to FIG. 5.

The above operations are essentially the same as those in case the primary core 1 enters the station from the right side of the figure.

After the primary core 1 stops at the station, supply of single phase AC current to the single phase coils 31 and 32 for stop position holding may be stopped, but it is recommended that the supply of current be continued in case the carrying rail is inclined.

When supply of current to the single phase coils 31 and 32 for positioning is stopped and a current is supplied to the proceeding magnetic field generation coil 9 in accordance with the desired moving direction, the primary core 1 which has been stopped at the station can be shifted again to the desired direction.

Supply of current to the travelling magnetic field generation coil 9 and the positioning single phase coils 31 and 32 wound around the primary core 1 is realized by a power supply 39 comprising the power supply rail laid on the base and the slide brush mounted in the side of primary core 1 working as the movable part.

Figure 16:
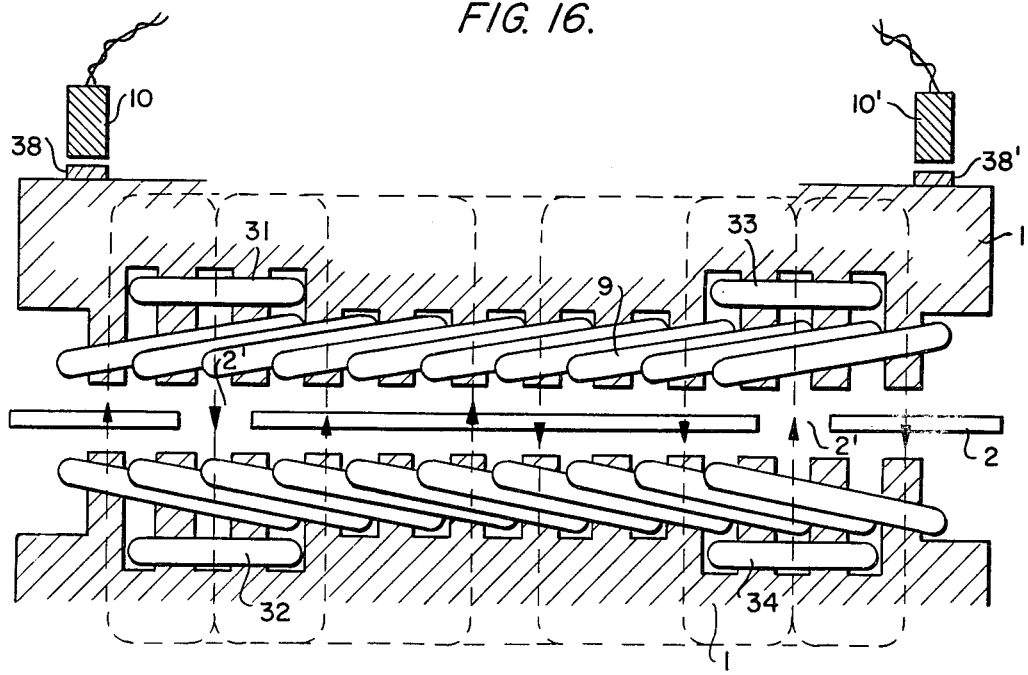
FIG. 16 shows the 4th embodiment of an induction type stop and holding system of the present invention.

FIG. 16 shows a fourth embodiment of the present invention. The numbering of FIG. 16 corresponds to those of FIG. 15.

As will be obvious from this figure, in the present embodiment, a pair of stop position holding coils 31 and 32, and 33 and 34 are arranged in two areas in the front and rear sides along the primary core 1 and the cut-away part 2′ is provided in two areas of the secondary conductor 2 at the station.

The positioning coils 31 and 33, (32, 34) wound around the primary core 1 are so wired that they form the magnetic flux loop as indicated by the broken line in the figure when a single phase AC current is supplied while the primary core 1 is in the stop condition. In addition, both coils 31 and 33 (32, 34) are respectively arranged in such a way that the relative position between the teeth of the primary core 1, on which the coils are wound, and the cut-away part 2' provided at the secondary conductor 2 is equal to that shown in FIG. 7.

The operation of this embodiment is the same as that of the embodiment shown in FIG. 15 and therefore further explantion is omitted. This embodiment realizes the positioning of the primary core more accurately and forcibly than that by the embodiment shown in FIG. 15.

Figure 17:
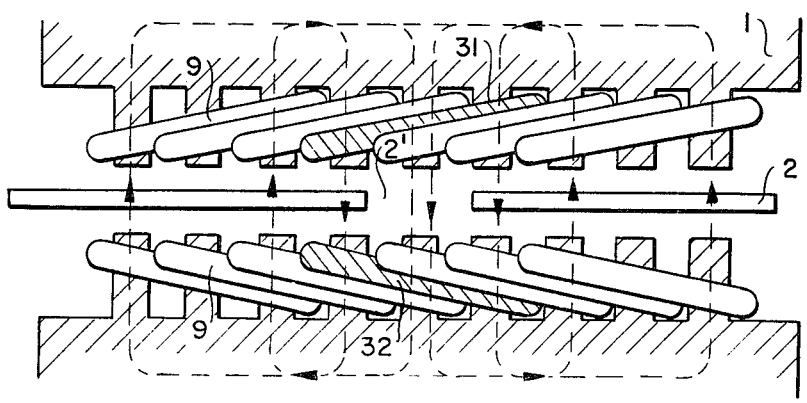
FIG. 17 shows the 5th embodiment of the present invention.

FIG. 17 shows a fifth embodiment of the present invention. The reference numbers of FIG. 17 correspond to those given for the embodiment shown in FIG. 15.

This embodiment is an example of a modification where the technology disclosed in the second embodiment is combined with the embodiment of FIG. 15 and is different from the embodiment shown in FIG. 15 because the stop position holding single phase coil wound around the primary core 1 is a part of the travelling magnetic field generation coil 9.

Although the wiring for this embodiment is not indicated, wiring exactly the same as that for the second embodiment can be employed. For the wirings, refer to FIG. 12 and FIG. 13.

Figure 19:
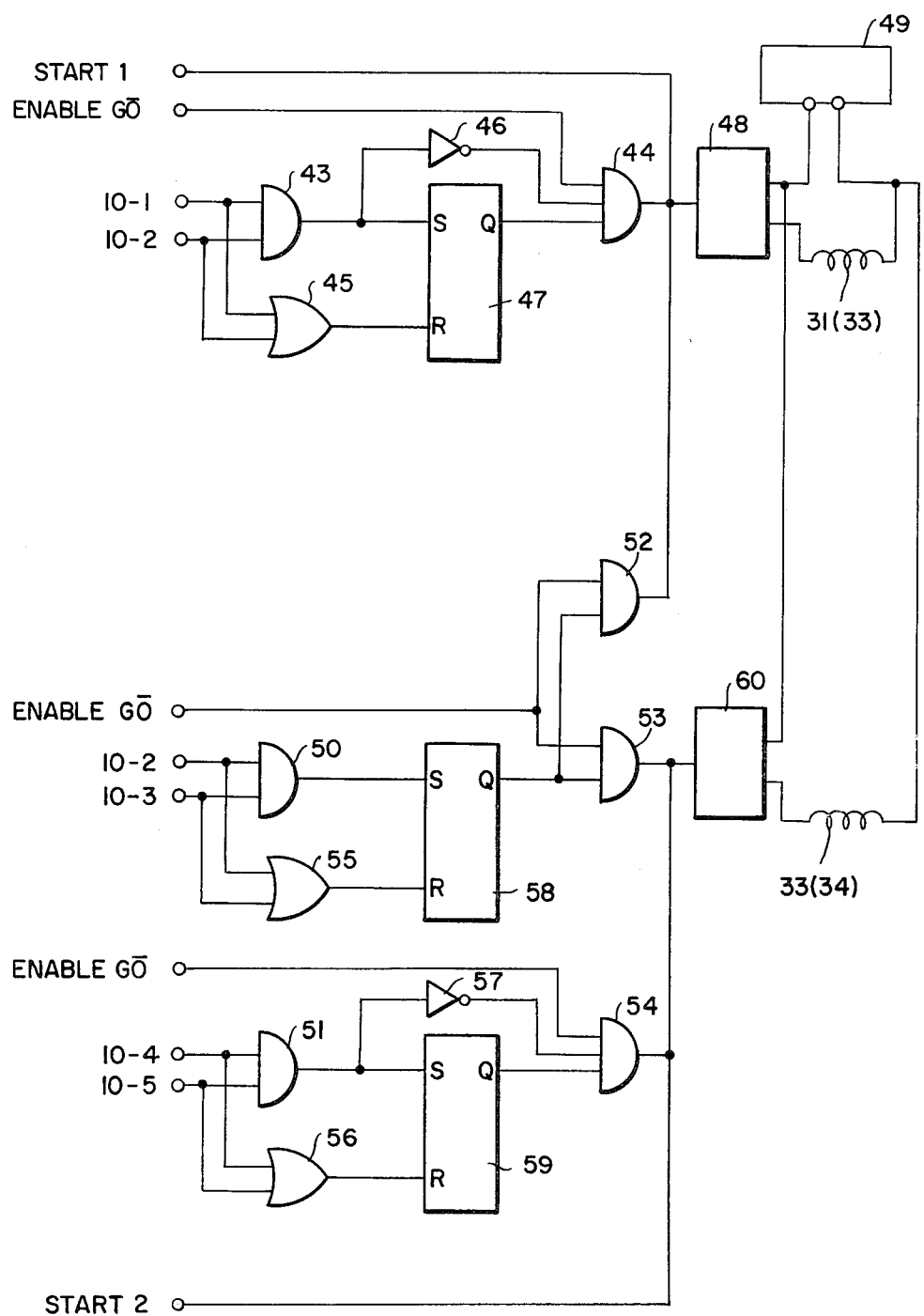

A sixth embodiment of the invention is shown in FIG. 18 and FIG. 19. This embodiment realizes start, shift, stop and holding by making use of only the stop position holding system of the present invention. Namely, the abovementioned first five embodiments explain the system where the positioning means is combined with the start and shift means. In the case of this sixth embodiment, however, only the positioning means is used for start and shift operations.

FIG. 18 shows the top view of this embodiment. In the figure, reference numeral 1 is the primary core; reference numeral 1a is the main pole formed on the primary core 1 with the predetermined interval; reference numerals 31 to 36 are single phase coils respectively wound around the main pole where 31 and 32, 33 and 34, 35 and 36 are respectively wound around the main poles $1a$-1, $1a$-2 and $1a$-3 arranged face to face respectively and wired so that the magnetic flux loop is formed as indicated by the arrow marks in the figure. In addition, reference numeral 2 is the secondary conductor plate; 10-1, 10-3, 10-5 are the front end sensors for right direction; 10-2, 10-4, 10-6 are the rear end sensors for left direction. These are used for detecting the front end and rear end of the secondary conductor plate provided at the area corresponding to the position x in FIG. 5. The sensor 10 is formed, for example, with the reflection type light detector.

Here, the length of secondary conductor 2 is set longer than the distance L between the sensors 10-2 and 10-3 provided at the position corresponding to the positions $x_1$ and $x_2$ in FIG. 5, and shorter than the distance M between the main poles $1a$-1 and $1a$-2. Therefore, it is possible to accurately stop the secondary conductor as in the case of the aforementioned embodiments.

In other words, in the above embodiments the single phase coil is used only for secondary conductor stop position holding. But, the structure of this sixth embodiment allows the secondary conductor 2 to be shifted using the same single phase coils.

The operation of this sixth embodiment will be explained by referring to FIGS. 18 and 19.

Considered here is the driving of the secondary conductor 2 towards the right of FIG. 18.

First, the secondary conductor 2 is set by being shifted to the right from the left side of the figure along the rail so that the front end point 2-1 of the secondary conductor 2 is positioned between the right direction front end sensor 10-1 and the left direction rear end sensor 10-2. Therefore, an output "0" from the sensor 10-1 and an output "1" from the sensor 10-2 are input to the drive circuit to be explained later. The drive circuit receives, under this condition, the enable signal from an operator or from the proper equipment and then supplies the single phase AC current to the single phase coils 31 and 32. Moreover, the drive circuit is configured so that it supplies a current to the single phase coils 31 and 32 only when the output of the sensor 10-1 is "0" and the output of the sensor 10-2 is "1", namely, when the front end point 2-1 of the secondary conductor is positioned between the sensor 10-1 and 10-2.

When a current is supplied to the single phase coils 31 and 32 from the drive circuit, the magnetic flux indicated by the arrows is generated by the respective single phase coils. resultingly, the secondary conductor 2 receives a force in the right direction based on the principle explained in regard to FIG. 1 to FIG. 5 and shifts on the rail by being guided therewith. Then, the sensors 10-3 and 10-4 detect the period wherein the front end point 2-1 of the secondary conductor is positioned between the opposing main pole $1a$-2, and supplies a single phase current to the single phase coils 33 and 34 connected, in the same way, to the drive circuit. As a result, the secondary conductor is accelerated and is shifted to the right. In the same way, the secondary conductor 2 can further be shifted along the rail. The shift of the secondary conductor 2 to the left can also be realized in the same manner. Namely, it is only required that the rear end point 2-2 of the secondary conductor be detected by both sensors 10 and a current supplied to the single phase coil while the rear end point is positioned between both sensors.

FIG. 19 shows an example of the drive circuit connected to the embodiment shown in FIG. 18. In this figure, reference numerals 43 and 44 and 50 to 54 indicate AND gates; reference numerals 45 and 55, 56 indicate OR gates; reference numerals 46 and 57 indicate inverters; reference numerals 47, 58, 59 indicate set/reset type flip-flops; reference numerals 48 and 60 indicate solid state relays serially connected to the coils 31 (32) and 33 (34).

An output of the sensors 10-2 and 10-3 is applied to the gate 50 which outputs a signal for supplying an AC current to both single phase coils 31 (32) and 33 (34) located at the front end and rear end of the secondary conductor 2 when both outputs are "1", namely when the secondary conductor 2 is positioned as indicated in FIG. 18. For this reason, when the gate 50 opens and the flip-flop 58 is set, and simultaneously when the negative pulse of enable signal, ENABLE GO is input, the gates 52 and 53 open. Each output of the gates 52 and 53 turns on the relays 48 and 60. Thereby, an AC current is simultaneously supplied to the single phase coils 31 (32) and 33 (34).

When a current is supplied to both single phase coils, the secondary conductor 2 positioned between both single phase coils generates a force directed to the center of the plate at both end points of it. Thus, the secondary conductor 2 is held between both single phase coils. While the secondary conductor is in the stationary condition, an AC current is continuously applied to both single phase coils. In case supply of current to any one of the single phase coils located at both end points of the secondary conductor 2 is stopped, the secondary conductor 2 is moved in the direction toward the single phase coil for which supply of current is stopped. Namely, in case it is required to shift the secondary conductor 2 to the left side, it is necessary to turn OFF the relay 48 by giving a signal to the start terminal START 1 of FIG. 19 and to stop the supply of current to the single phase coils 31 (32). In addition, in case it is required to shift to the right direction, it is necessary to turn OFF the relay 60 by giving a signal to the start terminal START 2 and to stop the supply of current to the single phase coils 33 (34).

FIG. 20 shows a seventh embodiment of the present invention. This embodiment corresponds to an improvement of the third embodiment shown in FIG. 14 to FIG. 17, wherein the secondary conductor is fixed and the primary core is movable.

In this figure, reference numeral 51 is the rail; reference numeral 53 is the carrier; reference 52 is the wheel provided outside the primary core 1; reference numeral 61 is the slide brush connected to the terminal of single phase coils 31 to 34; reference numeral 62 is the current supply rail which is laid on the base and connected to the single phase AC power supply.

As can be understood from the figure, in this embodiment, the secondary conductor 2 is arranged between the rail 51 at a predetermined interval and on the other hand the primary core 1 is supported movably on the rail 51 via the wheel 52. The primary core 1 has the single phase coils 31 and 32, and 33 and 34 respectively installed opposing one another at both ends of the core and the distance between the single phase coils 31 (32) and 33 (34) is set almost equal to the length of secondary conductor 2.

The operation principle is exactly the same as that of the sixth embodiment mentioned above. Namely, the carrying body comprising the primary core and the carrier, can be shifted in a predetermined direction based on the force indicated in FIG. 5 by selectively applying an AC current to any one of the single phase coil pairs 31 and 32 or 33 and 34 wound around the primary core. Supply of an AC current to each single phase coil is carried out via the power supply rail and the brush which is in contact with it and slides on it. In this embodiment, the carrying body can be stopped by simultaneously supplying an AC current to the single phase coils 31, 32, 33, 34 at both ends of the primary core as in the case of the abovementioned embodiment.

Figure 21:
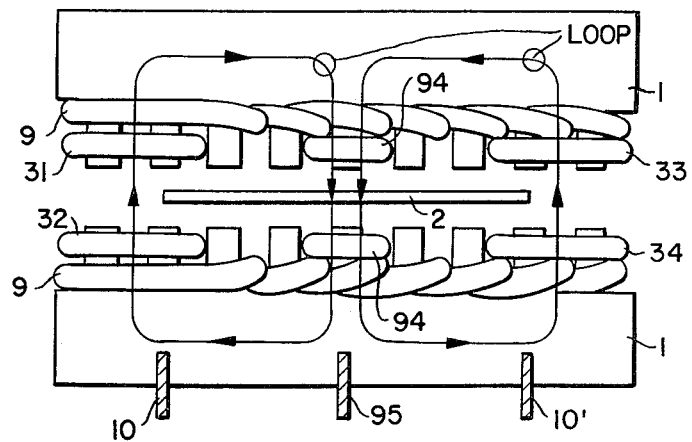
FIG. 21 shows the 8th embodiment of the present invention.

FIG. 21 shows an eighth embodiment of the present invention. This embodiment is an improvement of the first embodiment shown in FIG. 7. The numbering is the same as that of FIG. 7. In the figure, reference numeral 94 indicates the coil added in this embodiment for the supply of a DC current. The coil 94 is located between the single phase coils 31 to 34 and is wired so that it generates a magnetic field indicated by the loop in the same figure.

The operation of this embodiment will now be explained. When the secondary conductor 2 proceeds from the right to the left in the figure, at first, the secondary conductor 2 is detected by the position sensor 10'. An output of the position sensor 10' is then input to the drive control circuit (not illustrated). Thereby the travelling magnetic field generation coil 9 is activated by receiving a supply of current in such a way that a proceeding magnetic field directed to the right is generated. The operation up to this process in the same as that in the abovementioned embodiments. Then, the secondary conductor porceeds further to the left side and thereby its travelling speed is detected by the speed sensor 95. When the speed of secondary conductor 2 detected by the speed sensor is decelerated, for example, up to 0.1 m/sec, the activation of the proceeding magnetic field generation coil 9 is stopped. When the front end point of the secondary conductor 2 is detected by the sensor 10, a single phase AC current is supplied to all single phase coils 31 to 34, while a DC current is applied to the coil 94. At this time, a strong braking force is applied to the secondary conductor 2 due to a DC magnetic field generated by the coil 94. As a result, vibration of the secondary conductor while it is stopping is suppressed and therefore the secondary conductor stops accurately in a very short period of time.

As explained above, this embodiment is capable of accurately stopping and holding the stop condition of the secondary conductor running at a high speed within a very short period of time only by adding a DC coil to the single phase coils.

FIG. 22 to FIG. 25 show a ninth embodiment obtained by further modifying the sixth embodiment.

This embodiment, by skillfully using the principle explained in FIG. 1 to FIG. 5, has realized a single phase induction type stepping motor wherein the rotating body can be stopped at the desired position and can also be held in such a condition, and it can be started again in any direction from the desired position.

In these figures, reference numeral 111 is the secondary conductor working as the rotating plate; reference numerals 112A, 112B, 112C, 112D, 112E are primary cores; and reference numeral 113 is the sensor.

The rotating plate 111 is provided with four projected portions 114A, 114B, 114C, 114D extending in the radial direction, with an equal interval in the circumferential direction and is fixed to the shaft 115. The shaft 115 is supported rotatably on the bearing 117 mounted to the fixing plate 116. This rotating plate 111 is formed of a good conductive material, such as aluminum or copper.

The primary cores 112A, 112B, 112C, 112D, 112E are respectivley provided in pairs with the equal enterval sandwiching the projection of the secondary conductor on the concentric circumference to the rotating plate 111. The primary core opposing one side of the rotating plate 111 is fixed to the fixing plate 116, while the primary core opposing the other side is fixed to the fixing plate 118. The fixing plates 116 and 118 are coupled by means of the ring-shaped fixing material 119. Each primary core is respectively provided with the single phase coils 120 and 121 at both ends. The edges 122 and 123 indicated representatively at the primary core 112A correspond to the main poles in FIG. 1, while the intermediate part 24 corresponds to the auxiliary pole in FIG. 1. In the case of this embodiment, the rotating plate 111 is provided with four (even) projections and five (odd) primary cores are used. In general, one must be even and the other must be odd. The width W of each projection of the rotating plate 111 is determined in such a way that when the center of the projection matches the center of the primary core, the positional relation between the both sides of the projection and the primary core is equal to the positional relation at the position x in FIG. 5, like the positional relation between the projection 114A and primary core 112A in FIG. 22.

Five sensors 113 are mounted in the fixing plate 118, and their locations are selected so that they correspond to the position x in FIG. 5 of the primary cores.

Figure 22:
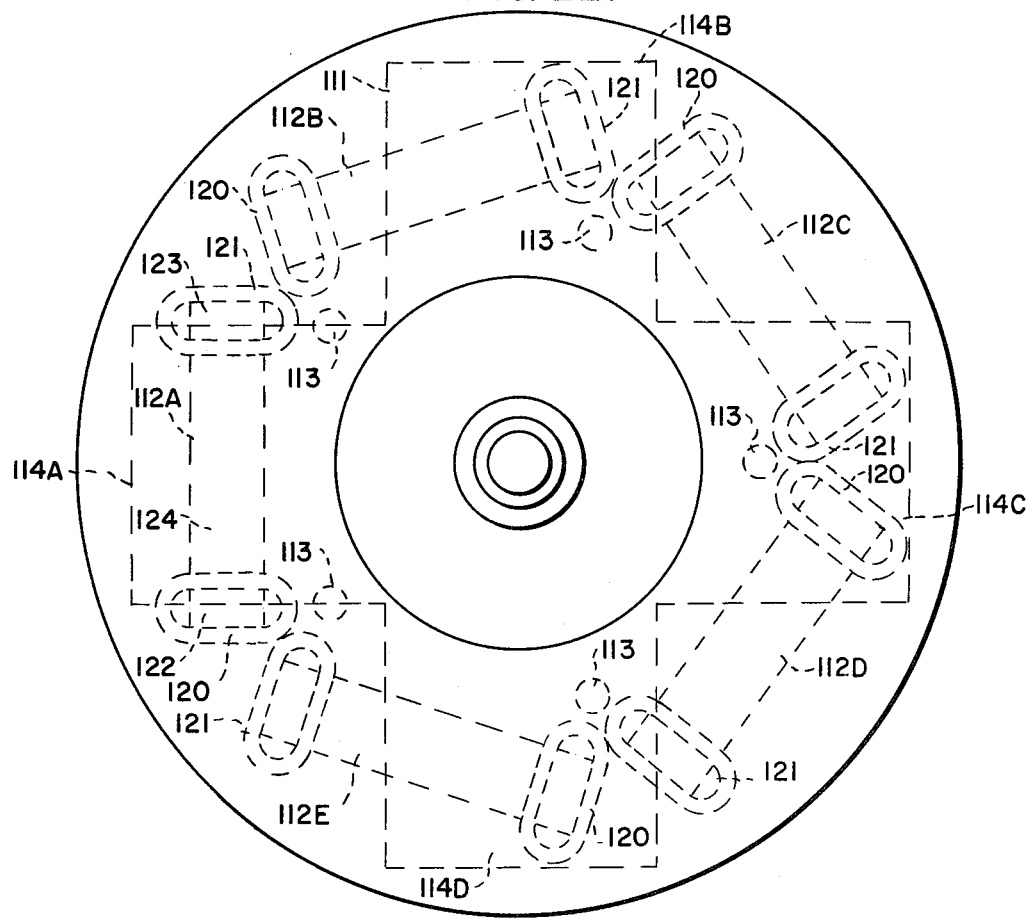
FIG. 22 to FIG. 27 explain the 9th embodiment of the present invention.
Figure 23:
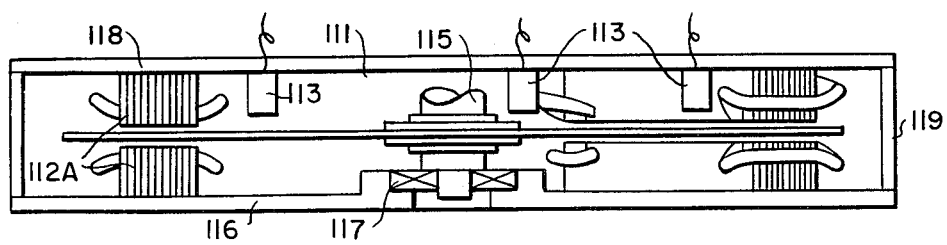
Figure 24:
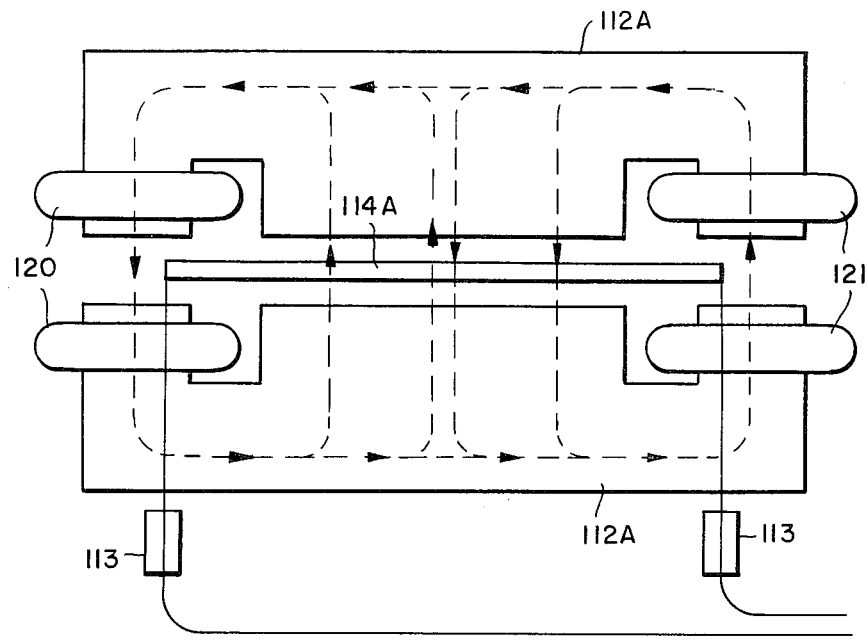
Figure 25:
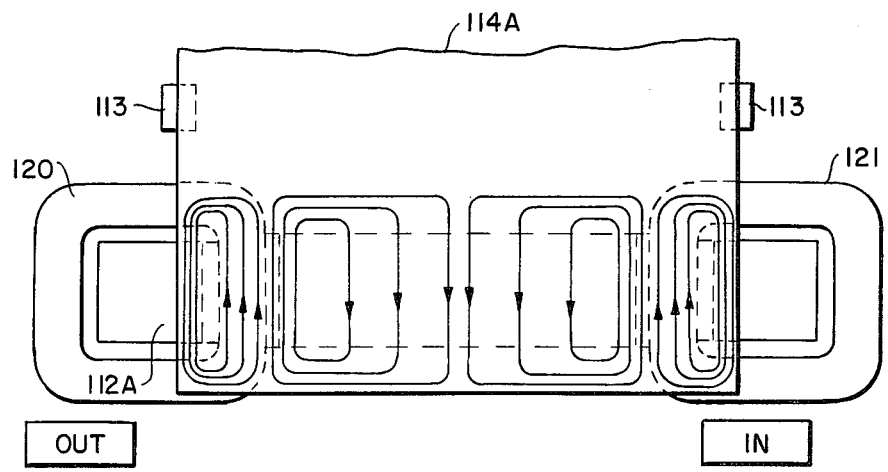

In other words, the positional relation between the primary core 112A, projection 114A and sensor 113 in FIG. 22 is as shown in FIG. 24, and the single phase coils at both ends of the primary core are so wired that the magnetic circuit is formed as indicated by the dotted line under this condition. These single phase coils work, as will be explained later, for starting, stopping and reversing the rotating plate 111. When the single phase coils 120 and 121 form such a magnetic circuit, and eddy current as indicated by the arrow in FIG. 25 is generated on the secondary conductor comprising the rotating plate 111.

An example of the drive system for such a single phase AC induction type stepping motor is explained below.

In case the rotating plate 111 stays at the postion in FIG. 24, the sensor 113 opposite the primary core 112A detects the current position of the rotating plate 111. When the rotating plate 111 starts to rotate in the clockwise direction of FIG. 24, the rotating plate 111 rotates in the clockwise direction so long as a single phase AC current is supplied, for a predetermined period, to the single phase coil 120 provided on the primary cores 112B and 112E. When the rotating plate 111 is in turn rotated in the counterclockwise direction, it rotates in the counterclockwise direction so long as a single phase AC current is supplied, for a predetermined period, to the single phase coil 121 provided on the primary cores 112B and 112E.

If, when the rotating plate 111 starts to rotate in the clockwise direction, at that moment, the sensor 113 in the side where the projection of the rotating body appears (one of the sensors 113 facing the primary core) turns to OFF from ON, then the sensor 113 activates for the desired time period, the single phase coil 120 of the primary core on both sides of the opposing primary core. Thus, the rotating plate 111 rotates continuously. Specifically, in FIG. 22, if when the rear end (lower end) of the projection 114A crosses the lower sensor 113 opposite the primary core 112A turning it OFF, a single phase AC current is applied, for a specified period, (such as when each projection of the rotating plate 111 is between the primary cores 112B and 112E, to the single phase coil 120 of the primary cores 112B and 112E adjacent to the primary core 112A), the rotating plate 112 continues to turn in the clock wise direction. Then, when the rear end of the projection 114A crosses the upper sensor 113 opposite the primary core 112A turning it OFF, a single phase AC current is applied, for the specified period, to the single phase coil 120 of the primary cores 112C, 112A adjacent to the primary core 112B, the rotating plate 111 rotates in the clockwise direction. Thereafter, the rotating plate 111 continues rotation in the clockwise direction by repeating such procedures explained above. Meanwhile if it is required to rotate the rotating plate 111 in the counterclockwise direction, it is enough to activate the single phase coil 121 in place of the single phase coil 120.

Now, the position operation of the rotating plate 111 will be explained. When the rotating plate 111 is rotating, for example, in the clockwise direction and it is required to stop the projection 114A as shown in FIG. 22 at the position opposite the primary core 112A, the projection 114A is coming from the side of the single phase coil 120 toward the primary core 112A. Therefore, the sensor 113 opposite the single phase coil 120 of the primary core 112A turns ON first and then the sensor 113 opposite the single phase coil 121 of the primary core 112A turns ON. When both sensors are ON, a single phase AC current is applied simultaneously to both single phase coils 120 and 121 of the primary core 112A, or it is at first applied to the single phase coil 121 and then to the single phase coil 120 after a certain period, namely after such a period where the rotating plate 111 is slowed but does not change rotating direction. Thereby the rotating plate 111 is accurately stopped at the position indicated in the figure. Even when the rotating plate 111 is rotating in the counterclockwise direction, such stop position holding can be done, although the activation of both sensors 113 and single phase coils 120 and 121 are reversed from the above.

In the case of this embodiment, a total of twenty kinds of positionings are possible. (Number of projections = 4) × (number of primary cores = 5) = 20.

As explained above, in the case of this embodiment, the rotating plate 111 while stopped at the desired position can be started to rotate in a desired direction and also can be stopped at a desired position with a comparatively simple structure.

Figure 26:
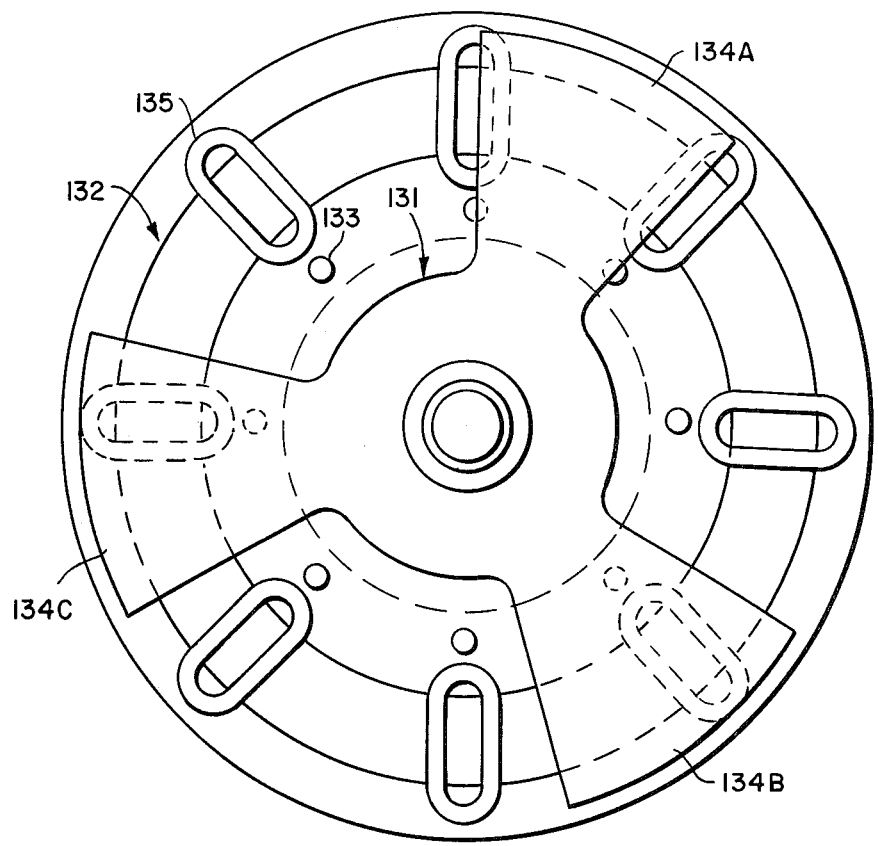
Figure 27:
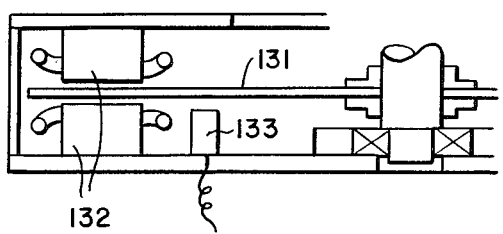

FIG. 26 and FIG. 27 show another embodiment of the present invention. In these figures, reference numeral 131 indicates the rotating plate; reference numeral 132 indicates the primary core; and reference numeral 133 indicates the sensor.

The rotating plate 131 integrates three projections 134A, 134B and 134C.

The primary core 132 is formed by integrating eight primary cores in the form of a ring, together with eight single phase coils.

The sensor 133 is provided opposite the inner side of the single phase coil 135.

The operation is not explained because it is the same as that of the preceding ninth embodiment. In the case of this embodiment, a total of 24 (3 × 8) positionings and reverse rotations are possible.

According to this embodiment, the single phase AC induction type stepping motor can be obtained, which is capable of causing a rotary body to rotate from any desired position and stopping the body at any desired position. Moreover, the structure is very simple, ruling out the shading coil and capacitor which have been required for the conventional single phase AC motor.

Next, other emboiments utilizing the principle of the present invention will be explained.

In the embodiments explained hereafter, the movable part is prevented from floating or floated by adapting the principle of the present invention, which is different from the abovementioned embodiments where the movable part stops, holds or starts to rotate or shifts between the primary core and secondary conductor.

Figure 28:
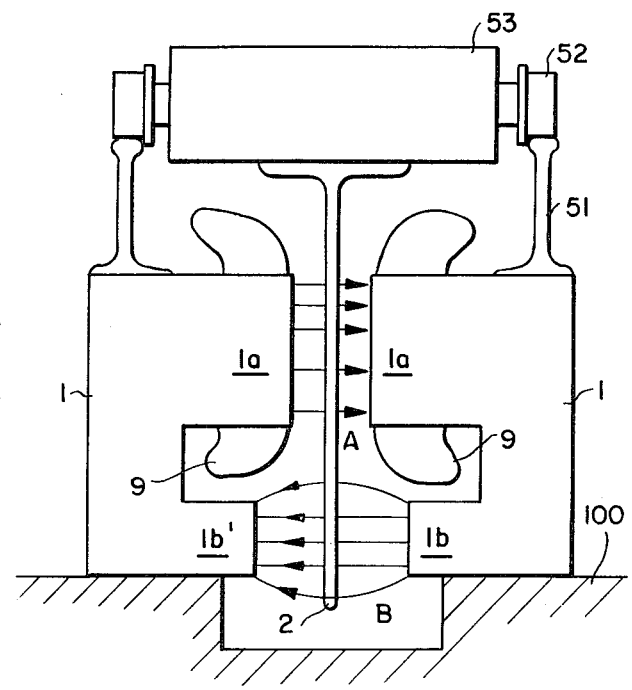
FIG. 28 and FIG. 29 explain other application examples utilizing the principle of the present invention.

FIG. 28 shows an embodiment where the principle of the present invention is used as a means for preventing the floating of the movable part.

The basic structure is almost the same as the first embodiment shown in FIG. 6. The numbering in the figure corresponds to that of FIG. 6. Reference numerals 1a and 1b indicate the main pole and auxiliary pole of the primary core respectively. Reference numeral 100 indicates the base.

As is understood from FIG. 28, the primary core 1 has the main pole 1a and auxiliary pole 1b, in this embodiment, along the direction (upper to lower direction on the drawing) which is orthogonally crossing the running direction of the secondary conductor (front to rear direction on the drawing), while the main pole and auxiliary pole are arranged opposing each other with respect to the surface of secondary conductor 2. The main pole 1a is wound by the travelling magnetic field generation coil 9. In addition, the poles of primary core 1 are respectively arranged on opposite sides of the secondary conductor 2.

The distance between the main pole 1a and secondary conductor 2 is shorter than the distance between the auxiliary pole 1b and the secondary conductor 2.

Figure 29:
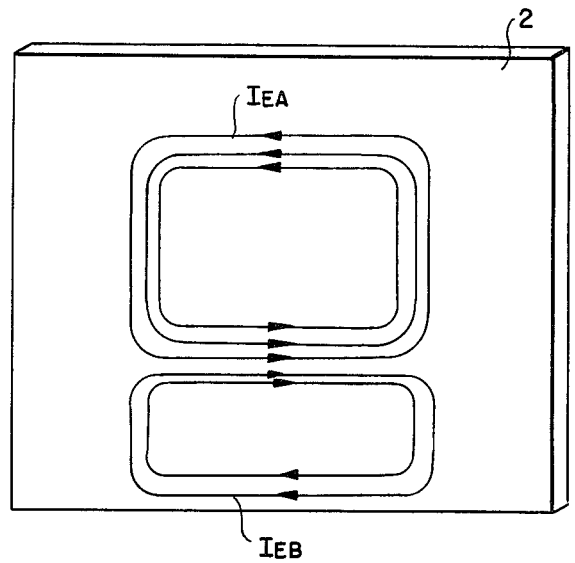

Next, operation of this embodiment will be explained by referring to FIG. 29.

First, when a three-phase current is fed to the travelling magnetic field generation coil, the magnetic flux is generated from the poles as indicated by the arrows in FIG. 28. As explained in the above embodiments, this magnetic flux forms the travelling magnetic field, namely the magnetic field which causes the secondary conductor to move in the front-to-rear direction on the drawing, and simultaneously forms the magnetic circuit loop passing from the main pole 1a to the primary core 1, the auxiliary pole 1b, then opposing primary core 1 and the main pole 1a.

In case the secondary conductor 2 does not exit between the main pole 1a and auxiliary pole 1b, the phase of magnetic flux passing through the gap between the main poles indicated by A in FIG. 28, leads by 180 degrees the phase of magnetic flux passing through the gap between the auxiliary poles indicated by B in the same figure. Distribution of an eddy current induced on the secondary conductor 2 when the secondary conductor plate exists at both gaps is shown in FIG. 29, which illustrates the secondary conductor 2 shown in FIG. 28, viewed from the left side. In FIG. 29, $I_{EA}$ indicates an eddy current induced in the region opposite the maim pole 1a, while $I_{EB}$ an eddy current induced in the region opposite the auxiliary pole 1b, respectively.

As will be understood from FIG. 28, the gap A is set longer than the gap B. Therefore, the permeance of gap A is larger than that of gap B. Resultingly, a lag in phase of magnetic flux at the gap A becomes larger than that at the gap B. Namely, the phase of the magnetic flux of gap A leads by 180 degrees the magneic flux of gap B.

From this fact, as is obvious from the operating principle diagram of FIG. 1 to FIG. 5, the proceeding field directed to the lower side is formed at the surface of secondary conductor 2 and therefore it generates a force directed to the lower side.

The secondary conductor 2 generates the travelling magnetic field along the carrying rail 51 each time the travelling magnetic field generation coil is activated, and simultaneously generates a force directed to the lower side. Thereby, floating of the upper side of the movable part can be suppressed effectively.

It is also possible to generate a force which causes the movable part to float upward by further developing this embodiment.

Based on the similar principle, it is possible to give a floating force to the movable part by forming the auxiliary pole 1b in FIG. 28 at the upper side of the main pole 1a, although not illustrated. This structure is very effective in case the movable part is heavy. Namely, the movable part can be shifted stably with a low drive force because a friction force between the wheel of the movable part and carrying rail can be alleviated. Of course, in case of introducing this structure, the weight of the movable part must be fully taken into consideration so that the floating force does not cause the wheel to run out of the rail.

In regard to this embodiment, the concept of preventing the floating of the movable part or applying a floating force to it by using the travelling magnetic field generation coil is explained. But, it is certain that such a concept can be attained by additionally providing the single phase AC magnetic field generation coil to the abovementioned embodiments.

Figure 30:
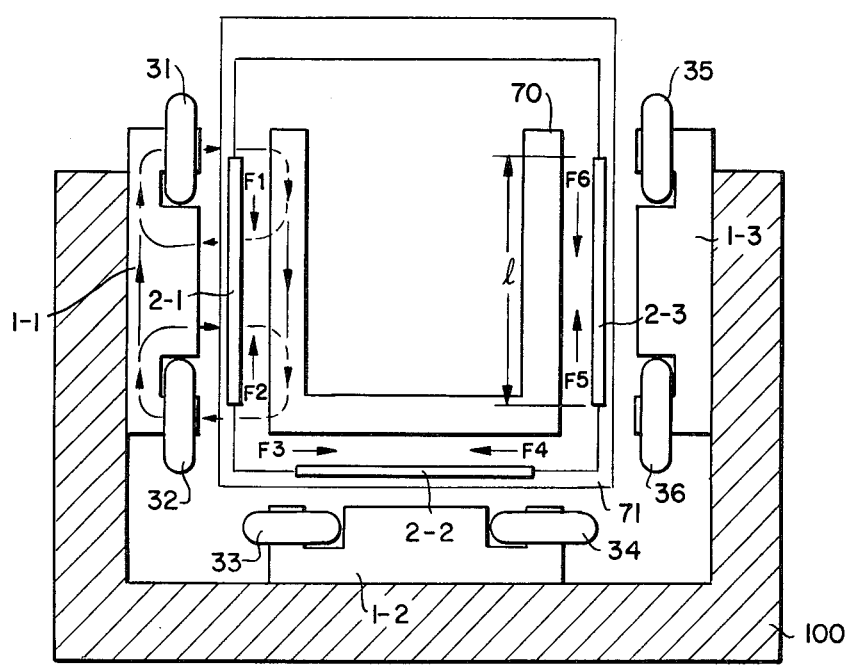
FIG. 30 explains another application example utilizing the principle of the present invention.

FIG. 30 shows another embodiment where the principle of the present invention is used to generate a force for floating the movable part.

This embodiment employs the structure not only for floating the movable part but also for stopping it at a predetermined position on the rail.

In the same figure, reference numeral 100 indicate the U-shaped base consisting of non-magnetic material; reference numeral 1-1 to 1-3 indicate primary cores mounted on each side of the base 100; reference numerals 2-1 to 2-3 indicate secondary conductors arranged corresponding to the fixed primary cores 1-1 to 1-3; reference numerals 31 to 36 indicate position single phase coils which are wound at both ends of the primary cores 1-1 to 1-3 and driven by the single phase AC; reference numeral 70 indicates the U-shaped yoke; reference numeral 71 indicates the movable part which supports the secondary conductors 2-1 to 2-3 and is composed of the non-magnetic and insulating material. Here, the movable part shifts in the front-to-rear direction on the drawing.

As is obvious from the figure, the secondary conductors 2-1 to 2-3 are arranged on three sides of the movable part 71 in this embodiment, while the primary cores 1-1 to 1-3 are arranged in the positions corresponding to each secondary conductor. The primary cores 1-1 to 1-3 have respectively wound thereon the single phase coils 31, 32 and 33, 34, and 35, 36 as shown. Each single phase coil pair is connected to the single phase power supply so that it generates a magnetic flux $\Phi$. The secondary conductor is set to the length l a little shorter than the distance between centers of a pair of single phase coils wound around the primary core.

In this structure, when the single phase coil is activated by the single phase AC current, the opposing secondary conductors 2-1, 2-2 and 2-3 generate the forces $F_1$ to $F_6$ as indicated by the arrows in the figure and thereby the movable part 71 is floated upward and then accurately positioned to the position indicated in the figure.

Namely, the single phase coils and edges of secondary conductors are arranged so that the edges of secondary conductors are positioned between the positions $x_1$, $x_2$ in FIG. 5. Therefore, the forces directed to the inside from the edge are generated, as shown in FIG. 30 at the edge of the secondary conductor. The secondary conductor stably stops at the position where a pair of opposing forces, for example, $F_1$ and $F_2$ are balanced.

Moreover, when both are set so that the edge of the secondary conductor is just positioned at the postition x in FIG. 5, namely when they are set at the position where the force $F_1$ generated by the single phase coil 31 and the force $F_2$ generated by the single phase coil 32, for example, become zero, in other words, in the position where a difference between the phases of the magnetic fluxes at the edge of the secondary conductor 2-1 and that of the central part becomes 180 degrees, the secondary conductor can be positioned more stably. Therefore, in this case, while the secondary conductor is positioned at any point, no force is generated on the secondary conductor based on the abovementioned principle. If it is displaced to the right or left, a force is generated in such a direction as to cancel it.

Thus, the movable part 71 having the secondary conductors thus arranged on three sides can be stably stopped and held at the adequate position without contact with the fixed side.

It is also possible, considering the weight of the movable part 71, to adjust so that a force directed upward against the movable part 71 can be generated. In this case, it is enough that the forces $F_2$ and $F_3$ work at the adequate position for this purpose, the length of secondary conductors 2-1 and 2-3 is increased a little, to increase the forces $F_2$ and $F_3$ generated at the edge of secondary conductor by the single phase coils 32 and 36. Namely, when $F_2+F_5=$ Weight of movable part $71+F_1+F_6$, the movable part 71 is stably floated. At this time, it is of course possible to obtain $F_1=F_6=0$ by adequately setting the length of the secondary conductors 2-1 and 2-3.

As explained above, this embodiment can realize the magnetic guide which can stably guide the movable part without any contact part, and having a simple structure.

As explained previously, the present invention can be utilized in a physical distribution system or material carrying system where it can effectively prevent the floating of the movable part and operate with less driving power by floating the movable part.

What is claimed is:

1. An induction type positioning system comprising:
   a magnetic yoke including at least one main pole and an auxiliary pole which is magnetically combined with said main pole;
   a single phase AC magnetic field generation means for inducing said main pole to generate a higher AC magnetic field, and to generate a lower AC magnetic field than said higher AC magnetic field;
   a conductive plate positioned within said higher and lower AC magnetic field such that said plate and yoke move relative to one another; and
   means for generating a holding force for stopping or holding the relative movement between said magnetic yoke and said conductive plate, said holding force responsive to a first eddy current induced on said conductive plate by the higher AC magnetic field generated by said main pole at a position where said conductive plate is opposite said auxiliary pole and the main pole, and a second eddy current induced on said conductive plate by the lower AC magnetic field generated by said auxiliary pole.

2. An induction type positioning system according to claim 1, wherein said single phase AC magnetic field generation means comprises a single phase AC magnetic field generation coil, and the main pole about which the single phase AC magnetic field generation coil is wound and to which the auxiliary pole is magnetically coupled.

3. An induction type positioning system according to claim 1, wherein said single phase AC magnetic field generation means comprises the main pole provided at a specified first position relative to said conductive plate and the auxiliary pole provided at a position spaced apart from said main pole.

4. An induction type positioning system according to claim 1, wherein said single phase AC magnetic field generation means comprises the auxiliary pole having an area facing said conductive plate larger than an area of the main pole facing said conductive plate.

5. An induction type positioning system according to claim 1, further comprising three-phase AC magnetic field generation coil, and wherein the single phase AC magnetic field generation means comprises a single phase coil means included in the three-phase AC magnetic field generation coil provided, for moving said conductive plate.

6. An induction type positioning system according to claim 1, wherein a pair of said single phase AC magnetic field generation means are arranged at positions spaced apart by an amount almost equal to or longer than the length of said conductive plate.

7. An induction type positioning system according to claim 1, wherein said conductive plate is fixed and comprises at least two linearly spaced apart plates, and said magnetic yoke is supported by and movable along said conductive plate and comprises the single phase AC magnetic field generation means.

8. An induction type positioning system according to claim 1, wherein the conductive plate is fixed and comprises at least two linearly spaced apart plates, wherein said spaces are arranged opposite said at least one main pole of said magnetic yoke, and said magnetic yoke is supported by and movable along said conductive plate and comprises the single phase AC magnetic field generation means.

9. An induction type positioning system comprising:
   a primary core comprising magnetic material, a main pole and an auxiliary pole being magnetically coupled with said main pole;
   single phase AC magnetic field generating means for generating a higher AC magnetic field at said main pole and a lower AC magnetic field at said auxiliary pole, said generating means comprising single phase AC coils respectively wound around corresponding main poles;
   a conductive plate having a specified length, a start and an end point, and positioned within said higher and lower magnetic fields;
   multiphase AC magnetic field generating means for moving said conductive plate;
   means for detecting said start and said end point of said conductive plate and for providing start and end point detection signals; and
   wherein said single phase AC magnetic field generating means holds, stops and moves said conductive plate and said primary core with respect to each other.

10. An induction type positioning system according to claim 9, wherein said primary core further comprises:
    a plurality of main poles and auxiliary poles magnetically coupled to corresponding main poles; and
    said multiphase AC magnetic field generating means comprises multiphase AC coils respectively wound about corresponding main poles.

11. An induction type positioning system according to claim 10, wherein said single phase AC magnetic field generating means comprises:
    single phase AC drive means for providing a single phase AC signal in response to said start and end point detection signals; and
    at least two of said multiphase AC coils spaced apart and operatively connected to said single phase AC drive means.

12. An induction type positioning system according to claim 10 or 11, wherein said multiphase AC magnetic field generating means further comprises:
   multiphase AC drive means for providing a pulse of multiphase AC signal to said multiphase AC coils in response to said start and end point detection signals.

13. An induction type positioning system according to claim 11, wherein said multiphase AC magnetic field generating means further comprises multiphase AC drive means for providing multiphase AC signals to said multiphase AC coils, and
   wherein said single phase AC drive means comprises one of said multiphase AC coils.

14. An induction type positioning system according to claim 11 further comprising:
   multiphase AC drive means for providing multiphase AC signals;
   switching means, operatively connected between said multiphase AC drive means, and said single phase AC drive means and multiphase AC coils, for providing said multiphase AC signals to said multiphase AC coils in response to said start and end point detection signals, and for providing a single phase AC signal of said multiphase AC signals to said single phase AC drive means in response to said start and end point detection signals.

15. An induction type positioning system comprising:
   a primary core comprising magnetic material, main poles, and auxiliary poles respectively, magnetically coupled with corresponding main poles;
   single phase AC magnetic field generating means for generating a higher AC magnetic field at each of said main poles and a lower magnetic field at each of said auxiliary poles, said generating means comprising single phase AC coils, respectively wound around corresponding main poles;
   a conductive plate positionable within said higher and lower magnetic fields and having at least one start and one end point; and
   means for detecting said at least one start and end point of said conductive plate, and for providing start and end point detection signals, said means for detecting positioned near some of said single phase AC coils.

16. An induction type positioning system according to claim 15, wherein said single phase AC magnetic field generating means comprises:
   a single phase AC signal generator; and
   switching means operatively connected between said single phase AC generator and single phase AC coils, for operatively connecting said single phase AC signal generator to said single phase AC coils in response to at least one of said start and end point detection signals.

17. An induction type positioning system according to claim 16, wherein said primary core is fixed and said conductive plate is movable, and single phase AC coils are spaced apart by a specified distance, and wherein said conductive plate has a length approximately equal to said specified distance and a portion positioned within said higher and lower magnetic fields.

18. An induction type positioning system according to claim 16, wherein said primary core is movable and said conductive plate is fixed, and said single phase AC coils are spaced apart by a specified distance, and wherein said conductive plate comprises a plurality of spaced apart plates positioned parallel to said primary core and having a length approximately equal to said specified distance.

19. An induction type positioning system according to claim 12 further comprising:
   speed detecting means for detecting the speed of relative movement of said primary core and said conductive plate, and for providing an output when the speed of relative movement is less than a specified value;
   a DC coil positioned between two of said single phase AC magnetic field coils and operatively connected to said means for detecting said start and stop points, said DC coil activated in response to said start signal and said end point signal.

20. An induction type positioning system according to claim 17, wherein said primary core has a circular shape with a predetermined number of single phase AC coils arranged on said primary core and spaced apart by a specified distance, wherein said conductive plate has a predetermined number of projections positioned within said higher and lower magnetic field of said primary core and having a length approximately equal to said specified distance, and wherein one of said primary core and conductive plate predetermined numbers is even, and the remaining predetermined number is odd.

21. An induction type position system according to claim 9, wherein said conductive plate is positioned a first distance from said main pole and a distance greater than said first distance from said auxiliary pole.

22. An induction type positioning system according to claim 9, wherein said conductive plate is positioned a first distance from said main pole and a distance less than said first distance from said auxiliary pole.

23. An induction type positioning system according to claim 20, further comprising a plurality of primary cores arranged in adjacent groups of three, each group being U-shaped, and wherein said conductive plate further comprises a plurality of spaced apart plated respectively arranged opposite corresponding primary cores.

* * * * *